(12) United States Patent
Lu et al.

(10) Patent No.: US 11,815,139 B2
(45) Date of Patent: *Nov. 14, 2023

(54) PDM TRANSMISSION WITH SLIDING CONTACT BETWEEN CONVEX SHAFT PINS AND CONCAVE BEARINGS SURFACES

(71) Applicant: Abaco Drilling Technologies LLC, Houston, TX (US)

(72) Inventors: Jing Lu, Houston, TX (US); Peter Thomas Cariveau, Houston, TX (US); Damon T. Landrum, Spring, TX (US)

(73) Assignee: Abaco Drilling Technologies LLC, Houston, TX (US)

( * ) Notice: Subject to any disclaimer, the term of this patent is extended or adjusted under 35 U.S.C. 154(b) by 339 days.

This patent is subject to a terminal disclaimer.

(21) Appl. No.: 17/190,386

(22) Filed: Mar. 2, 2021

(65) Prior Publication Data

US 2021/0190148 A1 Jun. 24, 2021

Related U.S. Application Data

(63) Continuation-in-part of application No. 15/721,959, filed on Oct. 1, 2017, now Pat. No. 10,934,778.

(Continued)

(51) Int. Cl.
*F16D 3/68* (2006.01)
*F16D 3/10* (2006.01)
(Continued)

(52) U.S. Cl.
CPC .............. *F16D 3/68* (2013.01); *F16D 3/10* (2013.01); *F16D 3/12* (2013.01); *E21B 4/003* (2013.01);
(Continued)

(58) Field of Classification Search
CPC ..... F16D 3/68; F16D 3/10; F16D 3/12; F16D 2300/06; E21B 4/003; E21B 17/046; E21B 17/07
(Continued)

(56) References Cited

U.S. PATENT DOCUMENTS 1,112,869 A 10/1914 Tirrell
1,625,511 A 4/1927 Ungerer
(Continued)

FOREIGN PATENT DOCUMENTS

SU 1434165 A1 10/1988

*Primary Examiner* — Greg Binda
(74) *Attorney, Agent, or Firm* — Zeman-Mullen & Ford, LLP

(57) ABSTRACT

Unlaminated bearings (or Torque Transfer Elements, or TTEs) are disposed to slide and displace within pockets (or "housing cavity receptacles") provided in the internal periphery of a housing in which an articulating shaft is received. As the shaft "tilts" about its untilted axial centerline during misaligned rotation, convex curved bearing surfaces on shaft pins slidably rotate against corresponding concave curved bearings surfaces on the T as received in the housing cavity receptacles. Further, substantially flat surfaces on the TTEs are disposed to slidably displace against corresponding bearing surfaces on the housing cavity receptacles as the shaft tilts and the convex curved bearing surfaces on the shaft pins slidably rotate against the concave curved bearing surfaces on the TTEs. The sliding displacement of TTEs with respect to the housing cavity receptacles during articulated rotation is in a direction generally parallel to the shaft's untilted axial centerline.

20 Claims, 21 Drawing Sheets

Related U.S. Application Data

(60) Provisional application No. 62/402,686, filed on Sep. 30, 2016.

(51) Int. Cl.
  *F16D 3/12* (2006.01)
  *E21B 17/07* (2006.01)
  *E21B 4/00* (2006.01)
  *E21B 17/046* (2006.01)

(52) U.S. Cl.
  CPC .............. *E21B 17/046* (2013.01); *E21B 17/07* (2013.01); *F16D 2300/06* (2013.01)

(58) Field of Classification Search
  USPC ......................................................... 464/152
  See application file for complete search history.

(56) References Cited

U.S. PATENT DOCUMENTS

| | | | |
|---|---|---|---|
| 2,760,359 A | 8/1956 | Wildhaber | |
| 3,257,826 A | 6/1966 | Peterson | |
| 4,565,541 A | 1/1986 | Obrecht | |
| 4,772,246 A | 9/1988 | Wenzel | |
| 5,000,723 A | 3/1991 | Livingstone | |
| 5,007,491 A | 4/1991 | Ide | |
| 5,052,501 A | 10/1991 | Wenzel et al. | |
| 5,078,650 A | 1/1992 | Foote | |
| 5,267,905 A | 12/1993 | Wenzel et al. | |
| 5,547,032 A | 8/1996 | Wenzel | |
| 5,704,838 A | 1/1998 | Teale | |
| 5,954,587 A | 9/1999 | Jacob et al. | |
| 6,042,479 A | 3/2000 | Hopson et al. | |
| 6,949,025 B1 | 9/2005 | Kraus et al. | |
| 7,186,182 B2 | 3/2007 | Wenzel et al. | |
| 8,033,920 B1 | 10/2011 | Benson | |
| 8,062,140 B2 | 11/2011 | Wall et al. | |
| 8,215,841 B2 | 7/2012 | Wenzel | |
| 8,894,497 B2 | 11/2014 | Kim | |
| 8,900,062 B2 | 12/2014 | Nicol-Seto | |
| 8,915,788 B2 | 12/2014 | Foote et al. | |
| 10,221,894 B2 | 3/2019 | St. Pierre et al. | |
| 10,267,366 B2 * | 4/2019 | LaGrange | E21B 7/067 |
| 10,316,895 B2 | 6/2019 | McMillan et al. | |
| 10,408,274 B2 | 9/2019 | Marchand et al. | |
| 10,934,778 B2 * | 3/2021 | Lu | F16D 3/68 |
| 11,661,972 B2 * | 5/2023 | Lu | F16D 3/185 464/158 |
| 2010/0313692 A1 | 12/2010 | Wenzel | |
| 2015/0167399 A1 | 6/2015 | Kuhn et al. | |
| 2016/0040484 A1 | 2/2016 | Underwood et al. | |
| 2017/0045090 A1 | 2/2017 | Kuhn et al. | |
| 2017/0082152 A1 | 3/2017 | LaGrange et al. | |
| 2019/0162242 A1 | 5/2019 | St. Pierre et al. | |
| 2019/0195286 A1 | 6/2019 | Marchand et al. | |

* cited by examiner

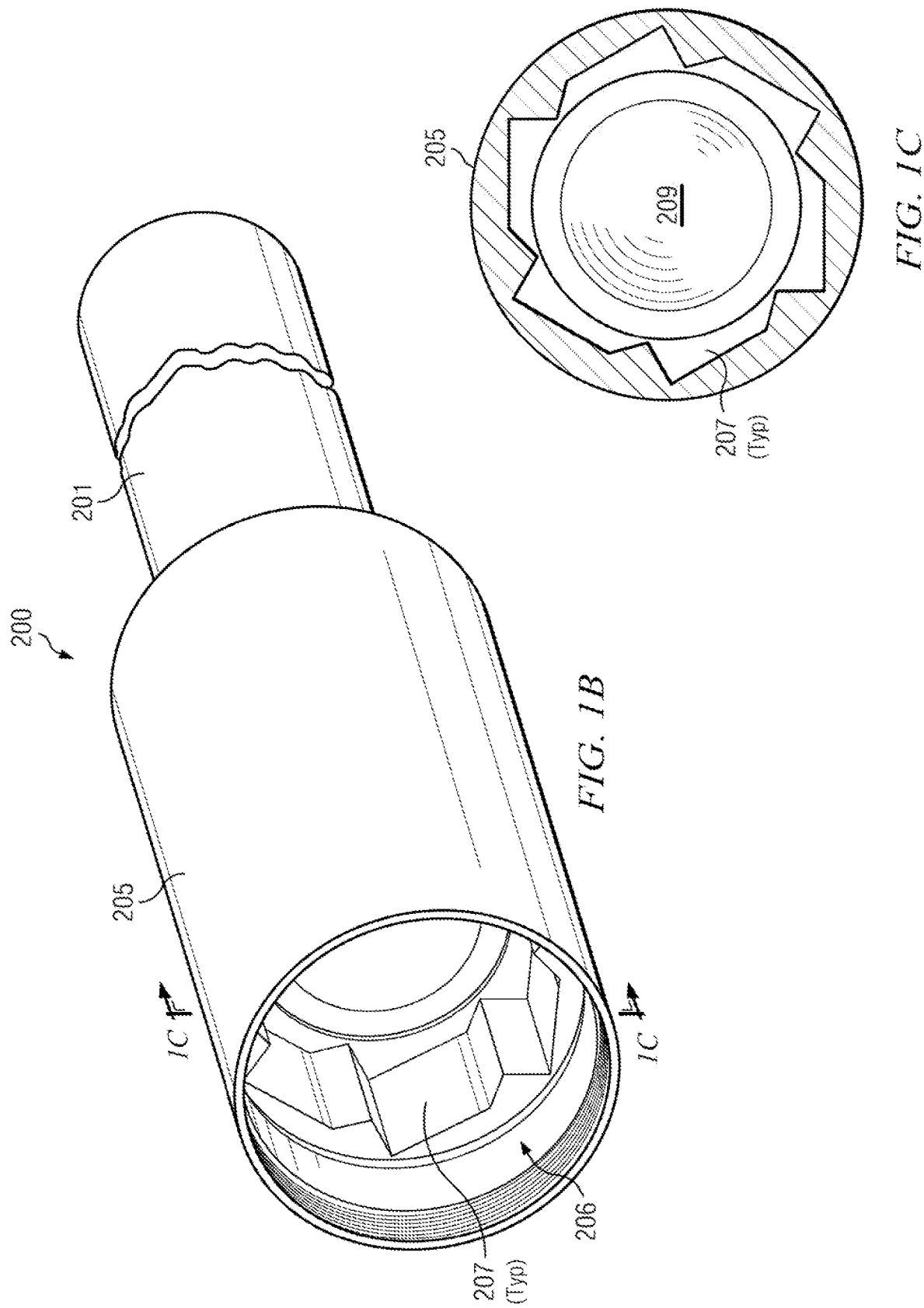

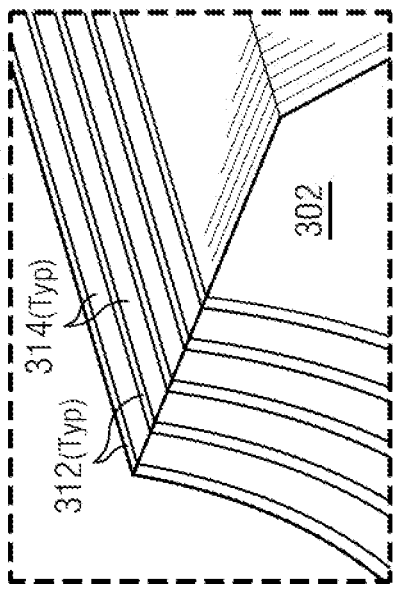
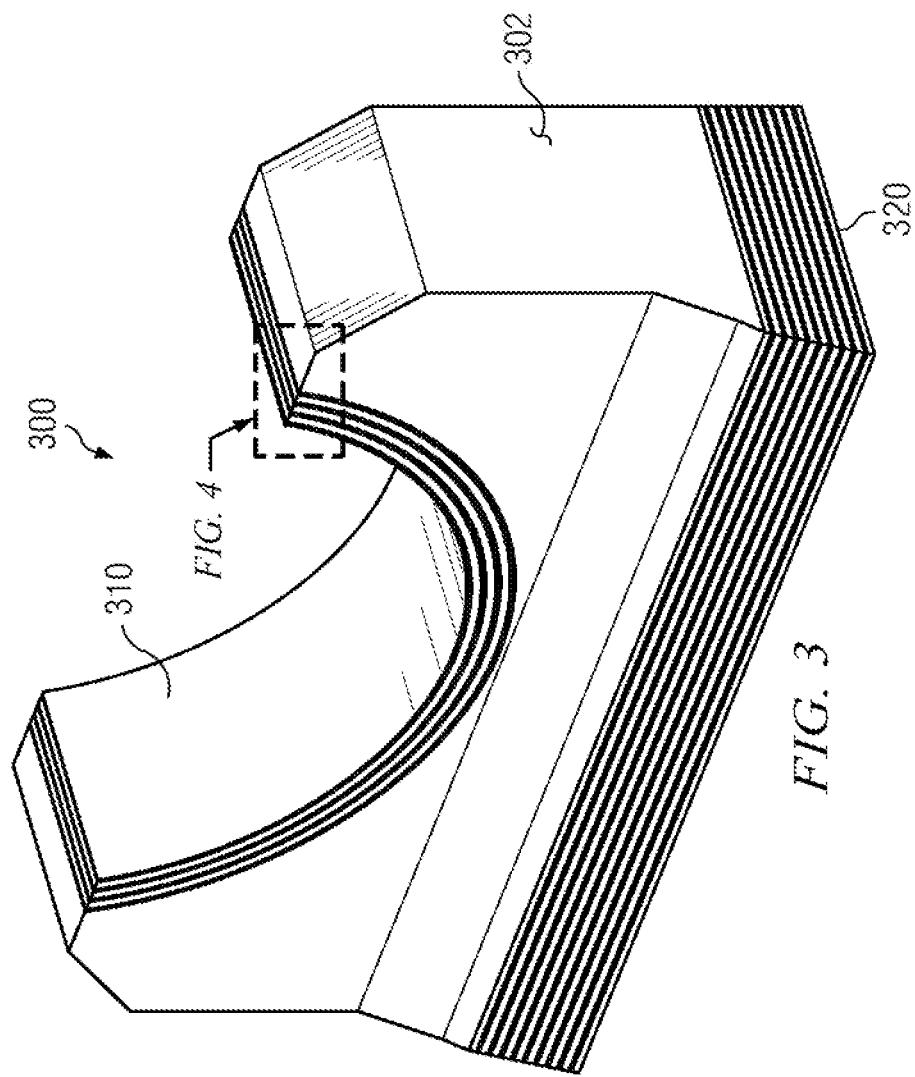
FIG. 4
FIG. 3

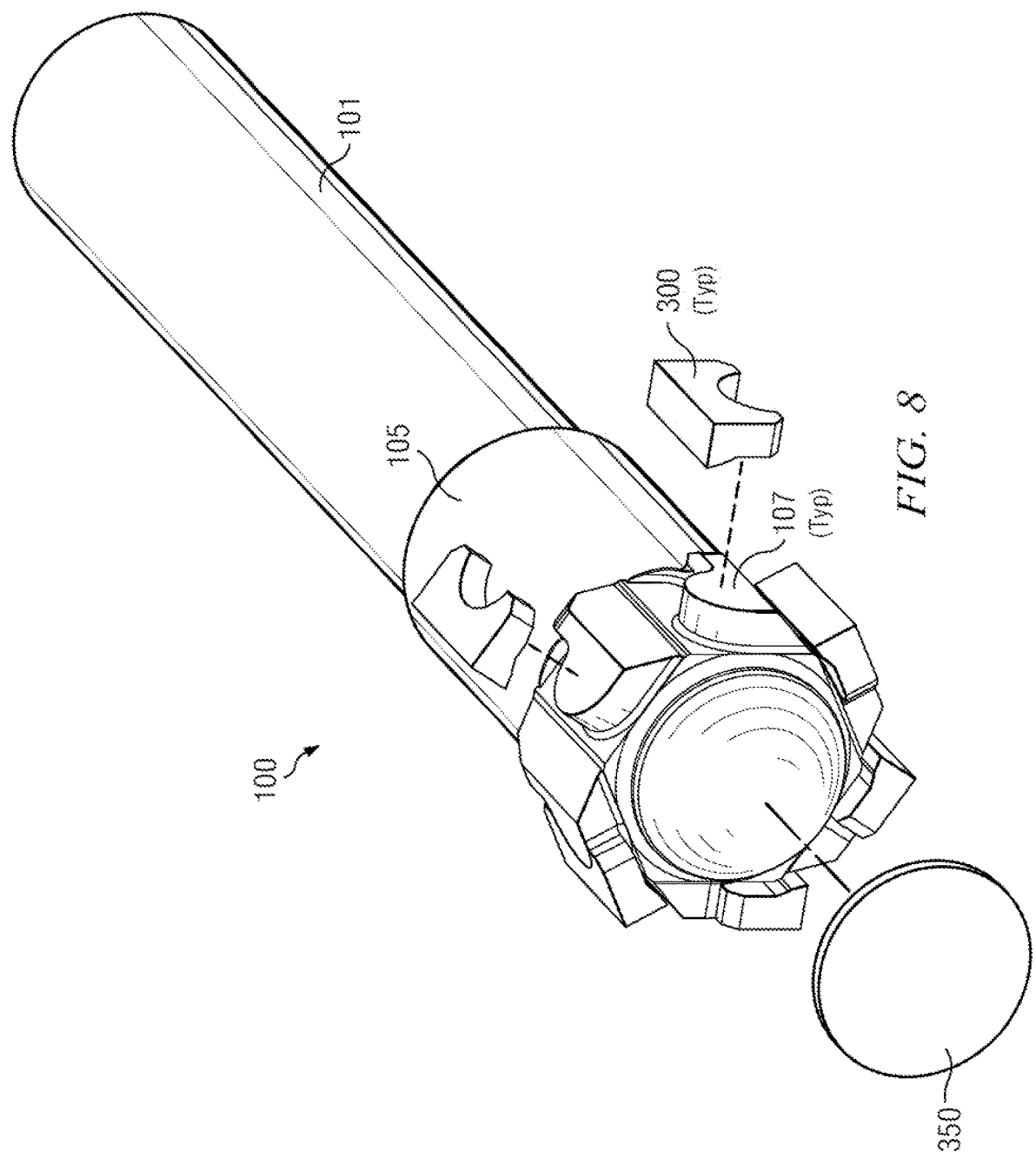

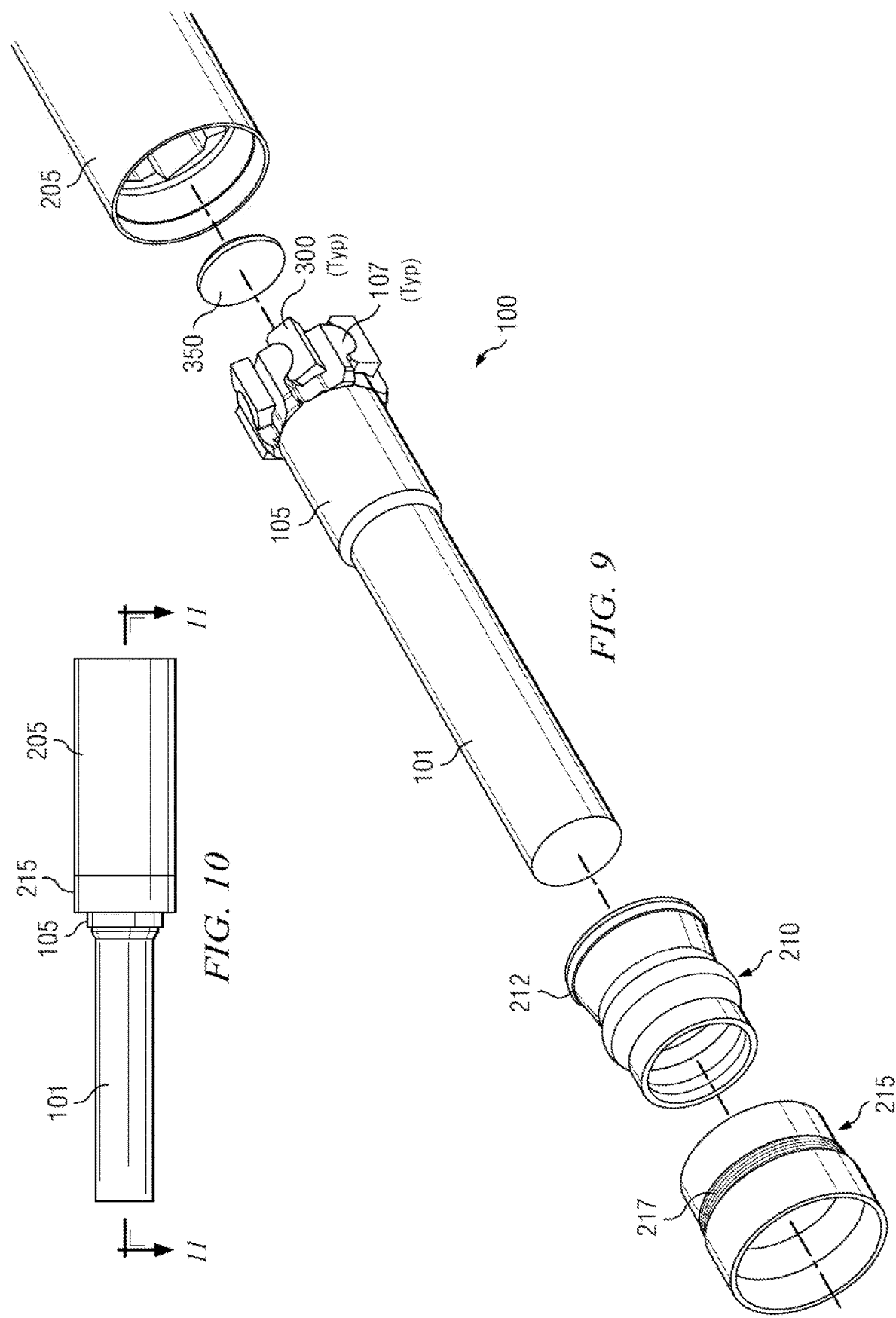

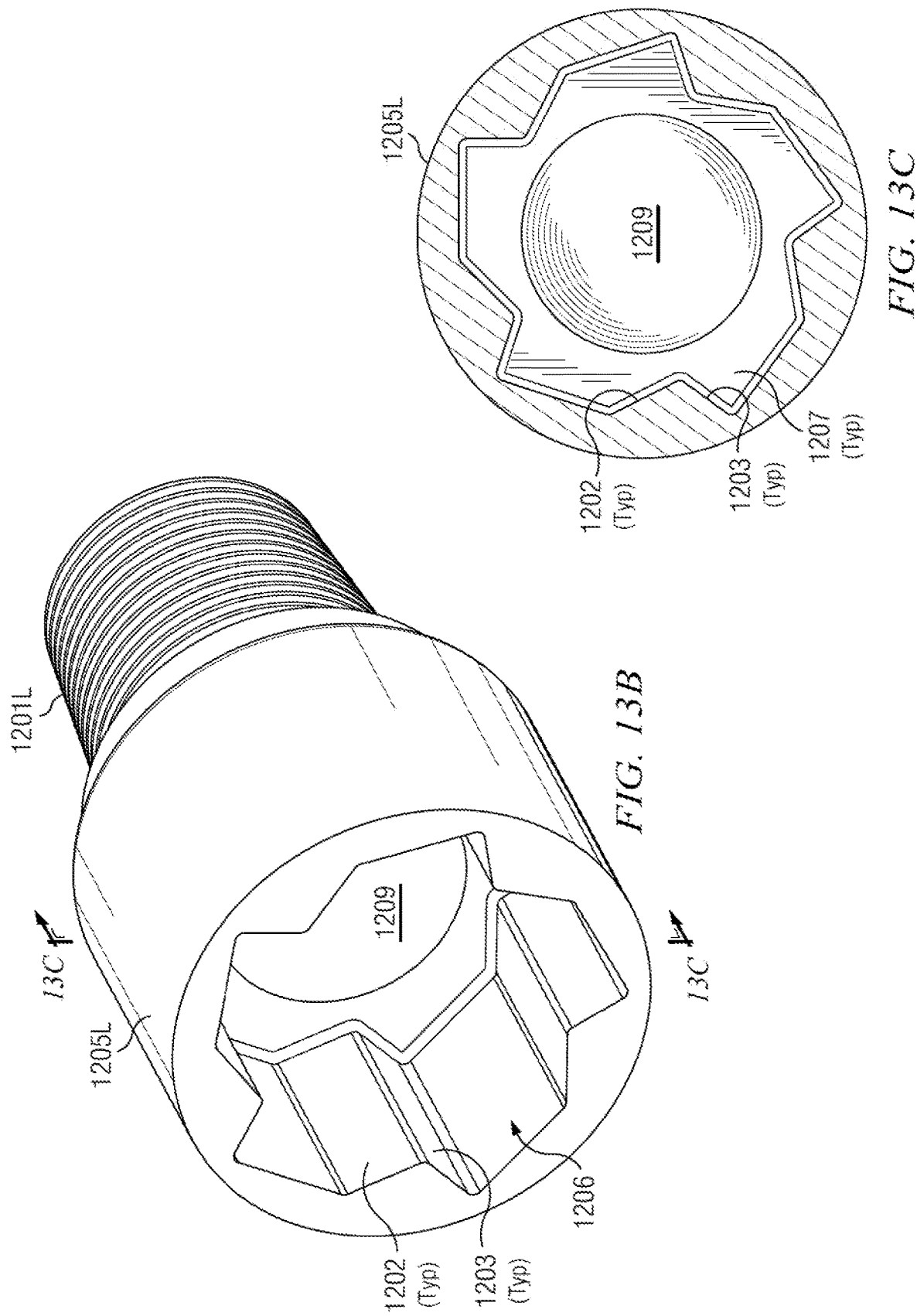

PDM TRANSMISSION WITH SLIDING CONTACT BETWEEN CONVEX SHAFT PINS AND CONCAVE BEARINGS SURFACES

RELATED APPLICATIONS

This application is a continuation-in-part of commonly-assigned U.S. Nonprovisional patent application Ser. No. 15/721,959, filed Oct. 1, 2017, now U.S. Pat. No. 10,934,778. Ser. No. 15/721,959 claims the benefit of, and priority to, commonly-assigned U.S. Provisional Patent Application Ser. No. 62/402,686, filed Sep. 30, 2016. The disclosures of U.S. Pat. No. 10,934,778, and of application serial nos. 15/721,959 and 62/402,686 are incorporated herein by reference in their entirety.

FIELD OF THE DISCLOSURE

This disclosure is directed generally to rotary power transmission assemblies particularly adapted for use in bottom hole assemblies ("BHAs") in order to transfer torque generated by a subterranean positive displacement motor ("PDM") to, for example, a rotary drill bit. In some embodiments, this disclosure is directed more specifically to such a transmission assembly using laminated rubber (or other elastomer) bearings elements having a "bridge"-style geometry in which a planar face opposes a generally concave curved face. In other embodiments, this disclosure is directed to transmission assembly embodiments using unlaminated or "monolithic" bearings elements (made of materials such as metal) that preferably also have the 'bridge"-style geometry.

BACKGROUND OF THE DISCLOSED TECHNOLOGY

It is well understood that bottom hole assemblies ("BHAs") include rotating power shafts that are necessarily misaligned by virtue of the BHA's design. For example, the rotation of the rotor in the PDM is eccentric and not concentric. This eccentric rotation of the rotor must be resolved into concentric rotation that will ultimately rotate the bit. Further, directional drilling in deviated wellbores necessarily causes misalignment of rotating power shafts in interconnected BHA components.

Specialized transmission sections designed for downhole applications transfer torque between such misaligned shafts. Conventionally, PDM transmission designs resolve the misalignment between input/output shafts via contact between cooperating components on each of the input and output shafts, and torque is transferred from input shaft to output shaft through internal bearings contact. Conventionally, such internal bearings contact is typically metal-to-metal. The metal-to-metal contact surfaces can deteriorate rapidly on some conventional designs, and in some downhole work environments. Deterioration can be a particular problem under heavy torque load. Such deterioration may shorten the service life of the transmission. Notable effects causing such shortened service life include galling of the metal-to-metal contact surfaces and resulting fretting and general erosion of the metal.

There are several types of PDM transmission designs known in the art. Constant Velocity (or CV) joint styles include: (1) ball bearing designs, in which torque is transferred via a pre-designed number of mating ball and socket couplings (typically 6 to 8); (2) spline designs, in which the cooperating metal surfaces have interlocking splines and receptacles; (3) woodruff key designs, in which torque is transferred via wedges, semicircles or other shapes; and (4) elliptical roller bearing designs, which are similar to ball bearing designs except with elongated ball and socket couplings (i.e. elliptical shapes) in order to provide more contact length in each coupling for better torque load distribution and transfer.

Other PDM transmission styles known in the art include: (1) flex shaft designs, in which an elongated input shaft resolves eccentric rotation into concentric rotation by flexing over its length; (2) flex shaft/CV joint combination and hybrid designs; and (3) knuckle joint designs, in which opposing tabs and slots interlock in a bending "knuckle" configuration to transfer torque with high sliding force contact and drilling mud exposure.

Even small amounts of fretting and other erosion can also cause loss of design kinematics in conventional transmission designs with metal/metal contact. Such loss in design kinematics can compromise the original design intent to transfer torque by distributed contact between multiple elements in the bearing surfaces provided in the conventional designs described above. The loss in distributed bearing contact manifests itself as a corresponding loss in torque transfer efficiency, caused by such effects as a change of transmission angle and erratic torque transfer through the bearing surfaces. In such cases, conventional transmissions may perform differently from specification over time (and usually not as well). More specifically, the surfaces of the bearings contacts in such designs become recessed away from the optimum 90-degree transmission angle and do not engage sliding surfaces at the same offset location or angle at which they were designed to operate. This causes irregular engagement between bearings surfaces and leads to stress concentrations not anticipated by original design considerations. Eventually, over time, the non-uniform wear of the bearings surfaces can cause transmission designs with two, three, four or more contacts to be driven by only one or two bearing surfaces, especially during instantaneous dynamic movement. This leads to accelerated wear and lateral misalignment. The lateral misalignment will also cause an increased orbiting lateral or transverse force during transmission rotation for which the bearing arrangement may not be designed.

As noted, all of the foregoing existing styles of transmission have service life issues caused, at least in part, by deterioration of the bearings contact interface(s). Abaco's U.S. patent application Ser. No. 15/721,959 (now U.S. Pat. No. 10,934,778) (hereafter "Parent Application") discloses laminated "bridge"-style bearings designs and embodiments addressing some of the above-described problems and needs in the prior art with laminated torsional bearings that flex rather than slide in providing torque transfer during misaligned (articulated) rotation. The present disclosure enlarges upon the Parent Application with description of unlaminated "bridge"-style bearings embodiments. In such embodiments, curve bearing surfaces (and preferably convex curved bearing surfaces) on transmission shaft pins are allowed to slidably rotate against corresponding curved surfaces (and preferably concave curved bearing surfaces) on the unlaminated bearing elements as the shaft "tilts" during misaligned rotation with respect to a housing. The unlaminated "bridge"-style bearings of the present disclosure are further free to slidably displace within receptacles provided in the periphery of the housing.

SUMMARY AND TECHNICAL ADVANTAGES

These and other drawbacks in the prior art are addressed in the Parent Application by a transmission providing laminated bearing embodiments including a contact interface between an input shaft and output shaft, in which the input and output shafts are misaligned. It will be appreciated that in a BHA application, the input shaft may typically be connected to the rotor of a PDM, and the output shaft to a flex shaft/constant velocity (CV) joint as part of the linkage ultimately connecting to a rotating bit. The transmission in the Parent Application provides an interlocking mechanism in which an input shaft adapter, on the end of the input shaft, is received into a recess in an output shaft adapter on the end of the output shaft. More specifically, shaped pins provided on the outer periphery of the input shaft adapter are received into shaped receptacles provided in the recess in the output shaft adapter. Shaped laminated torsional bearings are also placed within the confines of the receptacle, interposed between the input shaft adapter pins and the side walls of the receptacle.

Embodiments of the laminated torsional bearings disclosed in the Parent Application provide (1) a curved rubber/metal laminate portion to mate with a corresponding curved bearing surface of the input shaft adapter pins, and (2) a flat rubber/metal laminate portion to bear on the side walls of the receptacle. Specifically, the input shaft adapter pins bear upon the curved laminate portions of the torsional bearings, and the flat laminate portions of the torsional bearings bear on the side walls of the output shaft adapter receptacles. Thus, when torque is applied to the input shaft, torque is transmitted to the output shaft via flex in the torsional bearings rather than via sliding of contact surfaces.

The curved and flat laminate portions of the torsional bearings embodiments disclosed in the Parent Application are preferably made of alternating metal layer and rubber layer construction. The deployment of the torsional bearings between input shaft adapter pins and output shaft adapter receptacles is designed to avoid, or at least to minimize, relative sliding contact between bearing surfaces during transmission of torque. That is, the laminate design described in the Parent Application is such that transmission of torque, at least primarily, is via flex: (1) between the contact surfaces of the input shaft adapter pins and the curved laminate portions on the torsional bearings, and (2) between the contact surfaces of the flat laminate portions on the torsional bearings and the side walls of the output shaft adapter receptacles. Advantageously, adhesive may be used on the contact surfaces during assembly and service to inhibit sliding movement. In this way, according to laminated bearings embodiments described in the Parent Application, misalignment of input and output shafts during articulated shaft rotation is taken up by flex of the elastomeric layers in the curved and flat laminate portions of the torsional bearings, obviating sliding bearings contact and its associated drawbacks as described above in the Background section.

As noted above, the present disclosure enlarges upon the Parent Application with description of unlaminated "bridge"-style bearings embodiments. Dissimilar from the laminated bridge-style bearings embodiments described in the Parent Application (which are designed to flex rather than slide against shaft pins when taking up misaligned rotation), the unlaminated "bridge"-style bearings of the present application are designed so that the unlaminated bridge-shaped bearing elements (also referred to herein as "torque transfer elements" or "TTEs") promote sliding contact between curved surfaces on pins on the shaft and curved surfaces on the TTEs. Preferably, convex bearing surfaces provided on the transmission shaft pins are configured to slidably rotate against corresponding concave bearing surfaces on the unlaminated TTEs. In preferred embodiments, rotation of the shaft pins about the TTEs is about a generally radial axis centered on the shaft pins and orthogonal to the shaft's longitudinal axis.

With reference now to the "Background" section above, unlaminated bearings embodiments set forth in this disclosure address contact surface erosion and degradation problems described in the "Background" section in different ways than addressed by the laminated bearings embodiments described in the Parent Application. Unlaminated bearings embodiments as set forth in this disclosure are not configured to flex in order to limit sliding contact between transmission components. Unlaminated bearings designs as set forth in this disclosure necessarily require sliding contact between transmission components (such sliding contact preferably primarily comprising sliding rotation contact between convex bearing surfaces provided on the shaft pins and corresponding concave bearing surfaces on the unlaminated TTEs). However, unlaminated bearings embodiments as set forth in this disclosure are configured to optimize sliding contact between transmission components so that the prior art's contact surface deterioration problems are addressed and contact surface deterioration typically seen in conventional designs is reduced.

In a first aspect, therefore, this disclosure describes embodiments of a torque transmission comprising: an input shaft adapter having first and second ends, the first end of the input shaft adapter configured to mate with an input shaft, the second end of the input shaft adapter providing a plurality of pins disposed on an outer surface of the input shaft adapter, each pin providing a curved pin portion; an output shaft adapter having first and second ends, the second end of the output shaft adapter configured to mate with an output shaft, the first end of the output shaft adapter providing a recess formed therein; a plurality of notches formed in a recess periphery of the recess, one notch for each pin disposed on the input shaft adapter, wherein the recess is shaped and sized to receive the second end of the input shaft adapter such that when the second end of the input shaft adapter is received inside the recess, each pin on the input shaft adapter is received into a corresponding notch on the recess; a plurality of torsional bearings, a curved laminate portion provided on each torsional bearing; and wherein one torsional bearing is interposed between one pin and one corresponding notch when the pins are received into their corresponding notches, such that the curved laminate portion contacts the curved pin portion; and wherein selected torsional bearings each further comprise a flat portion, each flat portion contacting the notch when the pins are received into their corresponding notches.

In some embodiments according to the first aspect, selected flat portions of the torsional bearings are laminated.

In some embodiments according to the first aspect, each pin has a maximum pin nose diameter, and in which selected pin nose diameters are on a locus that coincides with an outer diameter of the output shaft.

In some embodiments according to the first aspect, the torque transmission further comprises a spherical bearing, the spherical bearing including a spherical bearing laminate portion; and a tip, the tip provided on second end of the input shaft adapter; wherein, when the second end of the input shaft adapter is received inside the recess, the spherical bearing laminate portion is interposed between the tip and the recess.

In some embodiments according to the first aspect, selected curved laminate portions include metal and elastomer layers.

In some embodiments according to the first aspect, selected flat portions of the torsional bearings include a laminate comprising metal and elastomer layers.

In some embodiments according to the first aspect, the spherical bearing laminate portion includes metal and elastomer layers.

In some embodiments according to the first aspect, the torque transmission further comprises a boot retainer, the boot retainer having first and second boot retainer ends; and an outer input shaft adapter periphery on the second end of the input shaft adapter and an outer output shaft adapter periphery on the first end of the output shaft adapter; wherein, when the second end of the input shaft adapter is received inside the recess, the boot retainer is received over the input shaft adapter and the output shaft adapter such that the first end of the boot retainer is affixed to the outer input shaft adapter periphery and the second end of the boot retainer is affixed to the outer output shaft adapter periphery.

In some embodiments according to the first aspect, the torque transmission further comprises an outer output shaft adapter periphery on the first end of the output shaft adapter; a fill port connecting the outer output shaft adapter periphery to the recess; and an evacuate port connecting the outer output shaft adapter periphery to the recess.

In some embodiments according to the first aspect, the torque transmission further comprises adhesive bonding between curved pin portions and curved laminate portions.

In some embodiments according to the first aspect, the torque transmission further comprises adhesive bonding between flat portions and notches.

In some embodiments according to the first aspect, the torque transmission further comprises adhesive bonding between the spherical bearing laminate portion and at least one of the tip and the recess.

In some embodiments according to the first aspect, selected pins each have a midpoint, and in which the curved pin portions on said selected pins each have a radius whose centerpoint coincides with the midpoint.

In a second aspect, this disclosure describes embodiments of a double knuckle transmission coupling, comprising: an input shaft having a first input shaft end and a second input shaft end, the second input shaft end having an input shaft slot defining an input shaft tongue and groove configuration; an output shaft having a first output shaft end and a second output shaft end, the first output shaft end having an output shaft slot defining an output shaft tongue and groove configuration; a plurality of arcuate tongue recesses, one arcuate recess formed in each tongue in the input and output shaft tongue and groove configurations; a center coupling element, the center coupling element including two pairs of knuckles, each knuckle providing an arcuate knuckle surface configured to be received within a corresponding arcuate tongue recess; a plurality of receptacles, one receptacle formed in each arcuate tongue recess; a plurality of torsional bearings, a curved laminate portion provided on each torsional bearing; wherein one torsional bearing is received into each receptacle, such that the curved laminate portions contact the arcuate knuckle surfaces when the knuckles are received within their corresponding arcuate tongue recesses.

The second aspect may include embodiments in which selected torsional bearings each further comprise a flat laminate portion, each flat laminate portion contacting the receptacle when the selected torsional bearings are received into their corresponding receptacles.

In a third aspect, this disclosure describes embodiments of a torque transmission, comprising: an input shaft adapter having first and second ends, the first end of the input shaft adapter configured to mate with an input shaft, the second end of the input shaft adapter providing a plurality of pins disposed on an outer surface of the input shaft adapter, each pin providing a curved pin portion; an output shaft adapter having first and second ends, the second end of the output shaft adapter configured to mate with an output shaft, the first end of the output shaft adapter providing a recess formed therein; a plurality of notches formed in a recess periphery of the recess, one notch for each pin disposed on the input shaft adapter, wherein the recess is shaped and sized to receive the second end of the input shaft adapter such that when the second end of the input shaft adapter is received inside the recess, each pin on the input shaft adapter is received into a corresponding notch on the recess; a plurality of bearings, a curved portion provided on each bearing; and wherein one bearing is interposed between one pin and one corresponding notch when the pins are received into their corresponding notches, such that the curved portion of the bearing contacts the curved pin portion; and wherein selected bearings each further comprise a flat portion, each flat portion contacting the notch when the pins are received into their corresponding notches.

The third aspect may include embodiments in which selected ones of the curved portions of the bearings and the flat portions of the bearings include a laminate. In such embodiments, the laminate may comprise metal and elastomer layers.

The third aspect may also include embodiments further comprising: a boot retainer, the boot retainer having first and second boot retainer ends; and an outer input shaft adapter periphery on the second end of the input shaft adapter and an outer output shaft adapter periphery on the first end of the output shaft adapter; wherein, when the second end of the input shaft adapter is received inside the recess, the boot retainer is received over the input shaft adapter and the output shaft adapter such that the first end of the boot retainer is affixed to the outer input shaft adapter periphery and the second end of the boot retainer is affixed to the outer output shaft adapter periphery.

The third aspect may also include embodiments further comprising: an outer output shaft adapter periphery on the first end of the output shaft adapter; a fill port connecting the outer output shaft adapter periphery to the recess; and an evacuate port connecting the outer output shaft adapter periphery to the recess.

The third aspect may also include embodiments in which selected pins each have a midpoint, and in which the curved pin portions on said selected pins each have a radius whose centerpoint coincides with the midpoint.

The third aspect may also include embodiments in which each pin has a maximum pin nose diameter, and in which selected pin nose diameters are on a locus that coincides with an outer diameter of the output shaft.

In a fourth aspect, this disclosure describes embodiments of an articulated transmission disposed to transmit torque via misaligned rotation, the transmission comprising: a shaft having an axial shaft centerline about which the shaft is disposed to rotate; a plurality of shaft pins, each shaft pin extending radially from the shaft centerline, each shaft pin further providing a curved shaft pin bearing surface thereon; a generally cylindrical housing having an axial housing centerline about which the housing is disposed to rotate, the housing having a plurality of housing cavity receptacles formed therein, each housing cavity receptacle for receiving a corresponding shaft pin; and a plurality of torque transfer elements (TTEs), each TTE providing a curved TTE pin bearing surface and a TTE housing bearing surface; wherein each housing cavity receptacle provides a housing bearing surface; wherein a shaft pin and a TTE are received into each housing cavity receptacle such that within each housing cavity receptacle, the shaft pin bearing surface is received onto the TTE pin bearing surface and the TTE housing bearing surface opposes the housing bearing surface; wherein, responsive to misaligned rotation of the shaft centerline with respect to the housing centerline and regardless of angular deflection of the shaft centerline with respect to the housing centerline experienced within each housing receptacle during an articulated revolution of the shaft: (1) the shaft pins are free to slidably rotate about the TTEs; and (2) the TTE housing bearing surfaces are free to slidably displace against corresponding housing bearing surfaces.

The fourth aspect may include embodiments in which shaft pins further provide a convex shaft pin bearing surface thereon and TTEs provide a concave TTE pin bearing surface.

The fourth aspect may also include embodiments in which the TTEs float at least generally parallel to an untilted shaft centerline when the TTE housing bearing surfaces slidably displace against corresponding housing bearing surfaces.

The fourth aspect may also include embodiments in which: each shaft pin further provides a shaft backlash surface; and each housing cavity receptacle further provides a housing backlash surface to oppose a corresponding shaft backlash surface; wherein the transmission further includes a backlash energizer assembly interposed between at least one opposing shaft backlash surface and housing backlash surface. In some embodiments, the backlash energizer assembly includes a puck. In some embodiments, the puck may separate a set screw and a Belleville washer. In some embodiments, the puck may include a laminate of metal and elastomer layers. In some embodiments, the backlash energizer assembly may include a plate, and in which the plate separates a set screw and a ball.

The fourth aspect may also include embodiments in which selected ones of the TTE pin bearing surfaces and the TTE housing bearing surfaces include a laminate. In some embodiments, the laminate may comprise metal and elastomer layers. In some embodiments, selected TTE pin bearing surfaces may include a hard facing. In some embodiments, selected TTE housing bearing surfaces may include curvature. In some embodiments, selected TTE housing bearing surfaces may include angled faces.

It is therefore a technical advantage of the disclosed laminated bearings to extend the service life of transmissions in which such laminated bearings are deployed. As noted above, relative sliding contact between bearing surfaces during torque transmission is minimized and ideally eliminated. Flex in the curved and flat laminate portions of the torsional bearings takes up and absorbs substantially all input/output shaft displacement due to shaft misalignment. The above-described disadvantages associated with galling and subsequent fretting/erosion of metal-to-metal bearings are thus substantially reduced, if not eliminated completely. Further, "constant velocity" contact in the torsional bearing surfaces in CV transmission style designs can be maintained over a more sustained period via flex in the disclosed torsional bearings, thereby extending the service life of such CV-style transmission designs over a conventionally expected service life.

Another technical advantage of the disclosed transmission with laminated bearings is that flex in the laminated bearings (both torsional and spherical) maintains design kinematics for the transmission, promoting efficient torque transfer per design through all torsional bearings during service, and efficient transfer of thrust loads through the misaligned input and output transmission shafts.

Another technical advantage of the disclosed transmission with laminated bearings is that periodic maintenance and refurbishment of the transmission is optimized. In prior designs with metal-to-metal contact, fretting, erosion and other service wear on and around the bearings cause larger metal components also to become periodically no longer serviceable, requiring their refurbishment or replacement along with the bearings themselves. Such larger metal components (such as housings, splined connections, etc.) are often expensive and time consuming to repair and replace. Serious deterioration of such larger metal components may even require the entire transmission to be retired from service prematurely. In the laminated bearings transmission described in this disclosure, however, absent extraordinary service events, only the torsional bearings will require periodic replacement. The avoidance of metal-to-metal contact in the disclosed transmission with laminated bearings means that larger metal components in the input shaft adapter and the output shaft adapter should remain substantially less worn over an extended service life.

It is a technical advantage of the disclosed transmission with unlaminated bearings to enable transfer of high torque loads as compared to some conventional CV-ball transmission designs. Unlaminated bearings embodiments as set forth in this disclosure preferably provide a shall with shaft pins formed integrally with the shaft on the shaft head. The resulting one-piece shaft head further transfers applied torque into unlaminated bearings at or near the maximum radius of the shaft head as received into the housing. In any proposed transmission deployment, the resulting potential for high torque load capability has to be weighed with the kinematics of a "bridge"-style bearings design as compared to conventional CV-ball transmission designs. The "bridge"-style design provides one less degree of freedom of movement in articulated torque transfer than can be offered by a CV-ball design. Also, the "bridge"-style bearing itself is more limited in its movement in housing pockets during articulated torque transfer than in a corresponding CV-ball design in that the "bridge"-style bearing is configured to slide generally longitudinally only relative to the shaft axis.

It is a further technical advantage of the disclosed transmission with unlaminated bearings to offer improved stability over conventional woodruff key designs. The disclosed designs have a comparatively longer circumferential aspect ratio at the shaft head than comparable woodruff key designs. The longer circumferential aspect ratio tends to stabilize the shaft better in the housing during misaligned rotation.

A further technical advantage of the disclosed "bridge"-style transmissions (laminated and unlaminated embodiments) is stability offered over comparable conventional designs in which the shaft pins are concave and the "bridge"-style bearings are convex. The geometry of a concave shaft pin is loaded along one of the long dimensions, resulting in "thin strip" contact area and a longer tilting "arm". The concave shaft pin design is thus more likely to tilt and the stress caused by contact loading on the thin strip contact area is high. In contrast, convex shaft pin embodiments according to the disclosed transmission designs are loaded along the short dimension, resulting in wider/larger contact area and shorter tilting arm. The convex shaft pin geometry thus allows the shaft pins to sit more stably in the housing receptacles. The convex shaft pins also tend to experience less stress since contact loading is on wider contact surfaces than provided on comparable concave shaft pins.

The foregoing has rather broadly outlined some features and technical advantages of the disclosed transmission designs, in order that the following detailed description may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described.

BRIEF DESCRIPTION OF THE DRAWINGS

For a more complete understanding of the embodiments described in this disclosure, and their advantages, reference is made to the following detailed description taken in conjunction with the accompanying drawings, in which:

FIGS. 1A through 12 illustrate various embodiments described in this disclosure including laminated torsional bearings, and in which further:

FIG. 1A is a perspective cutaway view of input shaft assembly 100 shown operationally engaged with output shaft adapter 205;

FIG. 1B is a perspective view of output shaft assembly 200;

FIG. 1C is a section as shown on FIG. 1B;

FIG. 3 is a perspective view of a torsional bearing 300;

FIG. 4 is an enlargement as shown on FIG. 3;

FIG. 5 is a perspective view of spherical bearing 350;

FIG. 6 is a section as shown on FIG. 5;

FIG. 7 is an enlargement as shown on FIG. 5;

FIG. 8 is a partially exploded view of input shaft assembly 100 in isolation;

FIG. 9 is a partially exploded view of FIG. 1A (without the cutaway on FIG. 1A);

FIG. 10 is an elevation view of FIG. 1A (without the cutaway on FIG. 1A);

FIG. 11 is a section as shown on FIG. 10; and

FIG. 12 is a modified version of FIG. 11 showing transmission misalignment.

FIGS. 13A through 20H illustrate various embodiments described in this disclosure including unlaminated embodiments with sliding contact between convex shaft pins and concave bearings surfaces, and in which further;

FIG. 13A is a partial cutaway and exploded view of an exemplary transmission embodiment according to this disclosure in which upper housing assembly 1200U is rotatably connected to lower housing assembly 1200L via misaligned (articulated) rotation of shaft assembly 1100;

FIG. 13B is a perspective view of lower housing 1205L on FIG. 13A in isolation;

FIG. 13C is a section as shown on FIG. 13B;

FIG. 16 is an enlargement as shown on FIG. 15B;

FIG. 17 is a fully exploded view of the exemplary transmission embodiment shown on FIG. 13A;

FIG. 18 is a further partial cutaway view of lower housing assembly 1200L as also illustrated on FIG. 13A;

FIGS. 20C and 20D, FIGS. 20E and 20F, and FIGS. 20G and 20H are matched pairs of cutaway section views and corresponding exploded isolation views of alternative backlash energizer embodiments.

DETAILED DESCRIPTION

Figure 1A:
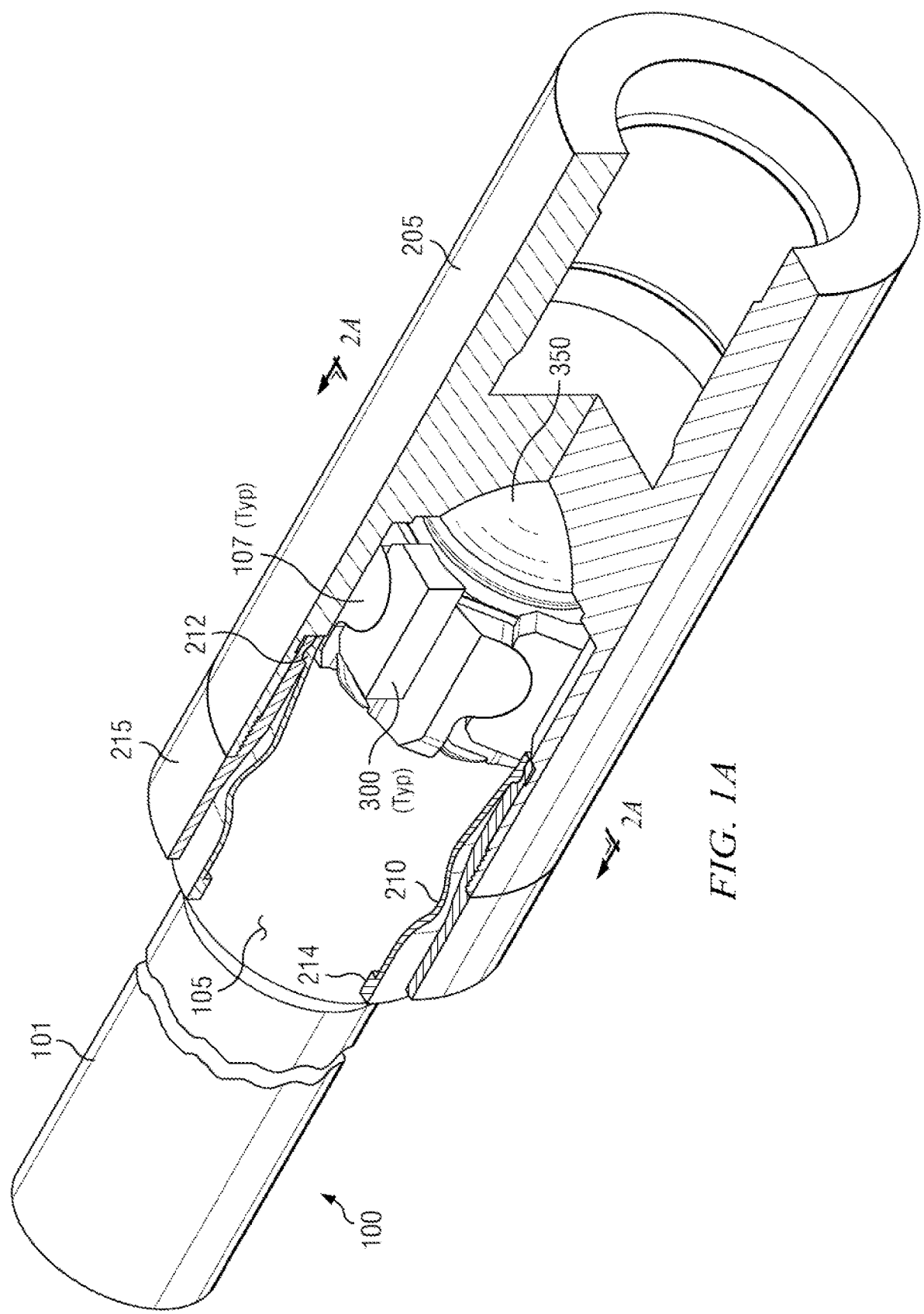

The following description of embodiments provides non-limiting representative examples using Figures, diagrams, schematics, flow charts, etc. with part numbers and other notation to describe features and teachings of different aspects of the disclosed technology in more detail. The embodiments described should be recognized as capable of implementation separately, or in combination, with other embodiments from the description of the embodiments. A person of ordinary skill in the art reviewing the description of embodiments will be capable of learning and understanding the different described aspects of the technology. The description of embodiments should facilitate understanding of the technology to such an extent that other implementations and embodiments, although not specifically covered but within the understanding of a person of skill in the art having read the description of embodiments, would be understood to be consistent with an application of the disclosed technology.

Laminated Bearings Embodiments

Reference is now made to FIGS. 1A through 12 in describing currently preferred transmission embodiments including laminated torsional bearings. For the purposes of the following disclosure, FIGS. 1A through 12 should be viewed together. Any part, item, or feature that is identified by part number on one of FIGS. 1A through 12 will have the same part number when illustrated on another of FIGS. 1A through 12. It will be understood that the embodiments as illustrated and described with respect to FIGS. 1A through 12 are exemplary, and the scope of the inventive material set forth in this disclosure is not limited to such illustrated and described embodiments.

The scope of the inventive material set forth in this disclosure is further not limited to specific deployments of the described embodiments. For example, the following description directed to laminated embodiments makes reference to input shaft 101 operationally engaged with output shaft 201 via connection of input shaft assembly 100 to output shaft assembly 200. It will be appreciated that in a typical BHA deployment, input shaft 101 may be connected to the rotor in a PDM, and output shaft 201 may be connected to the flex shaft/CV joint above the rotary bit. The description below is not limited to such an exemplary deployment, however, and for this reason input and output shafts 101 and 201 are referred to generically throughout.

FIG. 1A is a perspective cutaway view of input shaft assembly 100 operationally engaged with output shaft adapter 205 according to an exemplary embodiment of the transmission described in this disclosure. With momentary reference to FIG. 8, and continuing reference to FIG. 1A, it will be seen that input shaft assembly 100 comprises input shaft 101 conventionally connected to input shaft adapter 105 via, for example a threaded connection. Input shaft adapter 105 provides a plurality of shaped pins 107 on a distal end thereof.

With reference now to FIGS. 1B and 1C, output shaft assembly 200 comprises output shaft 201 conventionally connected to output shaft adapter 205 via, for example a threaded connection. Output shaft adapter 205 provides a plurality of shaped receptacles 207 in an internal cylindrical recess 206. [Shaped receptacles 207 may also be referred to as "notches' in this disclosure.] Cylindrical recess 206 is formed on a distal end of output shaft adapter 205. With additional reference to FIGS. 1A and 2A, for example, it will be seen that cylindrical recess 206 is provided in output shaft adapter 205 to receive input shaft adapter 105. Further, as shown on FIG. 2A, and as will be described in detail further on this disclosure, receptacles 207/notches on output shaft adapter 205 are shaped to receive pins 107 on input shaft adapter 105 when torsional bearings 300 are interposed between pins 107 and side walls of receptacles 207. FIG. 1C also depicts spherical bearing receptacle 209 formed on the inside end of cylindrical recess 206. As will be discussed in greater detail with reference to FIGS. 5 through 7, spherical bearing receptacle 209 is shaped to receive spherical bearing 350 illustrated on, for example, FIGS. 1A, 5, 8 and 9.

Figure 11:
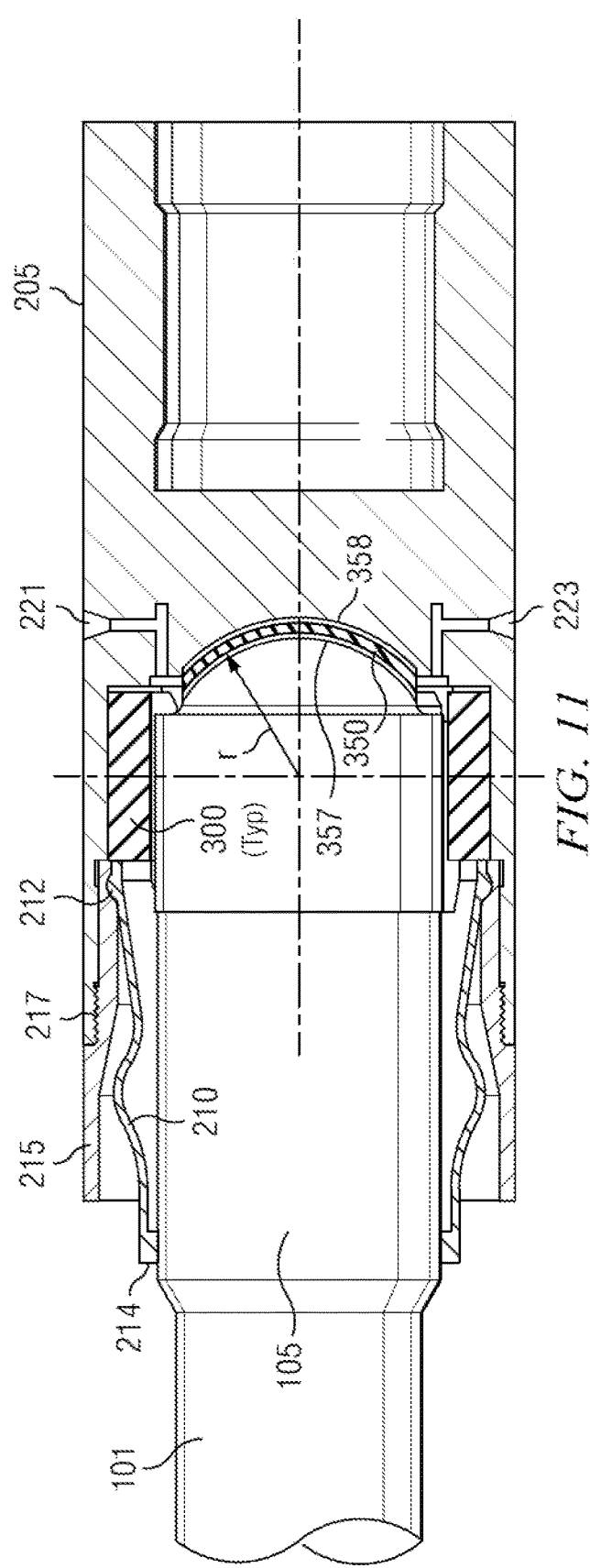

With reference to FIG. 1A again, and with further reference to FIG. 11, it will be seen that the connection between input and output shaft adapters 105 and 205 is protected by boot 210. Boot retainer 215 maintains and protects boot 210. Boot retainer 215 attaches to output shaft adapter 215 via threads 217. Metal strap 214 maintains one end of boot 210 in close contact with input shaft adapter 105. Seal lip 212 holds the other end of boot 210 to output shaft adapter 205. It will be therefore seen with reference to embodiments illustrated on FIGS. 1A and 11 that boot retainer 215 has first and second boot retainer ends, the first end towards input shaft 101 and the second end towards output shaft adapter 205. Input shaft adapter 105 has an outer input shaft adapter periphery on the second end thereof (towards output shaft adapter 205). Output shaft adapter 205 has an outer output shaft adapter periphery on the first end thereof (towards input shaft 101). When the second end of input shaft adapter 105 is received inside the recess provided by spherical bearing receptacle 209 in output adapter shaft 205, boot retainer 215 is received over input shaft adapter 105 and output shaft adapter 205 such that the first end of boot retainer 215 is affixed to the outer input shaft adapter periphery and the second end of boot retainer 215 is affixed to the outer output shaft adapter periphery. [Refer to description immediately above associated with FIG. 1C for further understanding of the recess provided by spherical bearing receptacle 209 in output adapter shaft 205].

Figure 2A:
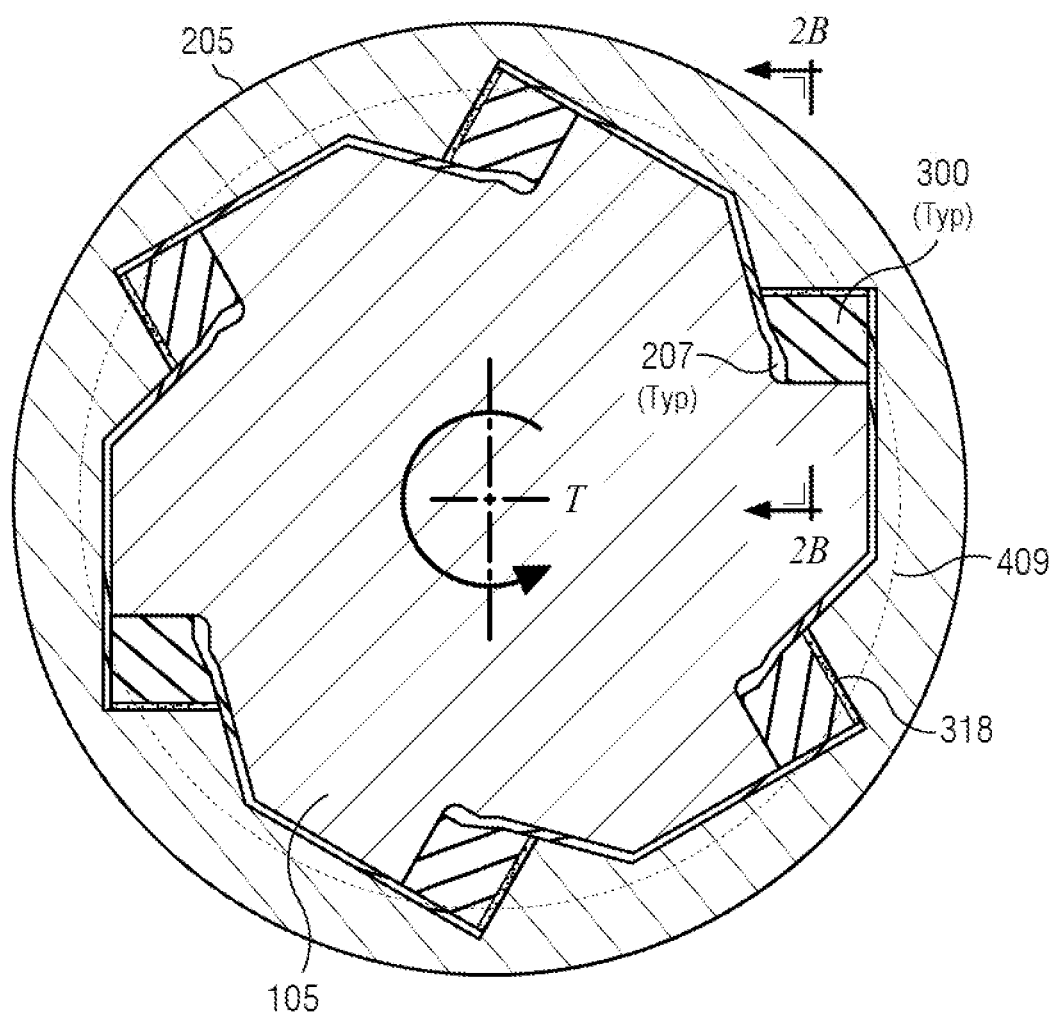
FIG. 2A is section view as shown on FIG. 1A.

FIG. 2A is a section as shown on FIG. 1A. When torque is provided to rotate input shaft adapter 105 in the direction of arrow T, input shaft adapter 105 engages torsional bearings 300 onto the side walls of the receptacles 207 provided in output shaft adapter 205. Torques is thus transferred to output shaft adapter 205.

Figure 2B:
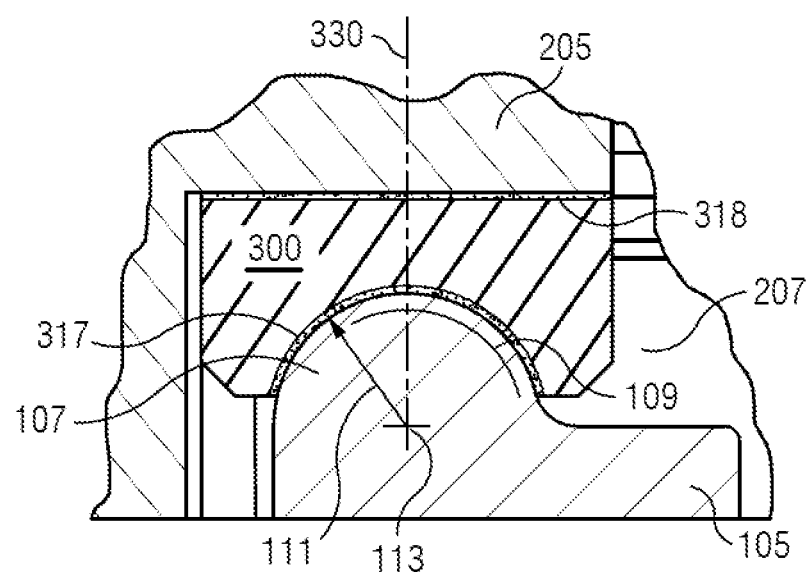
FIG. 2B is an enlarged section view as shown on FIG. 2A.

While the embodiment illustrated on FIG. 2A has six (6) torsional bearings 300, it will be appreciated that this number is exemplary only. The scope of this disclosure is not limited as to the number of torsional bearings provided in any embodiment. The number will be determined by user design factors such as, without limitation, size of input and output shafts 101 and 201, and amounts of torque to be transferred in view of stress performance of various constructions of torsional bearings 300. FIGS. 2A and 2B also depict that in some embodiments, adhesive bonding 318 may be provided between some or all of the flat laminate portions 320 of torsional bearings 300 and the shaped receptacles/"notches" 207 on output shaft adapter 205 (although the scope of this disclosure is not limited in this regard). Refer to description below associated with FIG. 3 for further understanding of flat laminate portions 320.

FIG. 2B is a section as shown on FIG. 2A. FIG. 2B shows that the engagement of torsional bearings 300 by input shaft adapter 105 is via curved portions of pins 107. With momentary reference to FIG. 3 (in which an exemplary torsional bearing 300 is depicted in more detail), it will be seen that the curved portions of pins 107 engage curved laminate portions 310 of torsional bearings 300. Returning now to embodiments illustrated on FIG. 2B, it will be seen that in some embodiments, adhesive bonding 317 may be provided between some or all of the curved portions of pins 107 and the curved laminate portions 310 of torsional bearings 300 (although the scope of this disclosure in not limited in this regard). Also, with further reference to FIG. 2B, it will be seen that torsional bearing 300 has a midpoint 330 which coincides with a corresponding midpoint on selected pins 107. As shown on FIG. 2B, the curved portions on said selected pins 107 each have a radius 111 whose centerpoint 113 coincides with the midpoint 330.

With further reference now to FIGS. 2A and 2B, it will be appreciated that in currently preferred embodiments, the geometries illustrated are designed so that the maximum pin nose diameters 109 on pins 107 are on a locus 409 whose diameter coincides with the external diameter of output shaft 201 (such external diameter also illustrated on FIG. 2A as dotted line 409). In this way, in such currently preferred embodiments, torque is directly transferred through the full cross-section of output shaft 201, substantially unifying the torque stress gradients across output shaft 201 near the connection with output shaft adapter 205. It will nonetheless be appreciated, however, that the scope of this disclosure is not limited to deployments in which locus 409 of maximum pin nose diameters 109 coincides with the external diameter of output shaft 201.

FIG. 3 is a perspective view of a currently preferred embodiment of a torsional bearing 300 (also shown in situ on, for example, FIGS. 1A, 2A and 2B). Torsional bearings 300 are shaped to be received in an interposed relationship between pins 107 on input shaft adapter 105, and the side walls of receptacles 207 on output shaft adapter 205. In this interposed relationship, pins 107 contact a curved laminate portion 310 on torsional bearings 300. Curved laminate portion 310 is described in more detail below with reference to FIG. 4. The side walls of receptacles 207 contact a flat laminate portion 320 on torsional bearings 300. Curved laminate portion 310 and flat laminate portion 320 are separated by metal portion 302.

FIG. 4 is an enlargement as shown on FIG. 3. FIG. 4 illustrates curved laminate portion comprising alternating metal layers 312 and rubber layer 314. Although FIGS. 3 and 4 have been illustrated with a metal layer 312 as the immediate contact interface with pins 107 on input shaft adapter 105, this disclosure is not limited in this regard. Other embodiments may provide a rubber layer 314 as the immediate contact interface with pins 107. It has been found advantageous to provide a rubber layer 314 as the immediate contact interface with pins 107 in deployments where adhesive is used to adhere torsional bearings 300 to pins 107 during assembly.

Referring particularly to rubber layers 314 on FIG. 4, each rubber layer 314 is preferably less than 0.030" thick, and more preferably in the range of 0.015 to 0.002" thick, in order to maintain a beneficial compressive stress field throughout nearly the entire rubber layer during service. Although the scope of this disclosure is not limited to particular thicknesses of rubber layers 314, it has been found that thicknesses in the above guidelines tend to reduce the tendency of the rubber to extrude from the edge of curved laminate portion 310 when placed under load (compression, shear and some bending). The preferred layer thicknesses for rubber layer 314 may be obtained by highly precise calendaring operations during manufacture, using extremely stiff rolling cylinders to extrude the strip form of uncured "green" rubber. The preferred layer thicknesses may also be obtained by extrusion through a highly accurate and sharp strip die. The strip of "green" rubber may also be cured or semi-cured in the strip form prior to bearing assembly. This may be accomplished with an oven, autoclave or microwave heating. A microwave heating source is more preferred and can offer a continuous cure cycle. The strip may be cut to size and assembled into layers with the metal components.

Currently preferred embodiments customize rubber material selections for rubber layers 314. The selection of material for rubber layer will also dictate the exact preferred method of forming rubber layer 314 and bonding them to metal surfaces such as on metal layers 312. A high temperature rubber material such as fluorinated silicone rubber (FSR) is advantageous for extended use in transmissions whose service includes elevated bottom hole temperatures. In other embodiments, rubber material selections may be made from, for example, natural rubber (NR), nitrile butadiene rubber (NBR), hydrogenated nitrile butadiene rubber (HNBR), fluoroelastomers (FKM), perfluoroelastomers (FFKM), or ethylene propylene diene monomer (EPDM) rubber formulations.

Referring now to metal layers 312 on FIG. 4, each metal layer 312 is preferably a high strength carbon alloy steel or stainless steel, preferably with a yield strength in a range of 140 ksi to 230 ksi (higher strengths preferred for highly stressed metal layers 312). Metal layer thicknesses are preferably in a range of 0.001" to 0.030", and more preferably in a range of 0.002" to 0.015", although this disclosure is not limited in this regard. Further, the ratio of thicknesses of rubber layers 314 to metal layers 312 within curved laminate portion 310 is preferably in a range of 1.0 to 2.0, although again this disclosure is not limited in this regard. A currently preferred embodiment of curved laminate portion 310 has rubber layers 314 that are 0.002" thick, and metal layers 312 that are 0.002" thick.

Preferred thicknesses of metal layers 312 may be initially obtained from sheet rolling operations or thin film deposition techniques. Final forming of the metal layers 312 may be accomplished pressing with a suitable die. Metal layers 312 having thicknesses in the above preferred ranges will typically take the form of high strength foils. Examples of commercially available high strength foils that may be used for metal layers 312 include Integran Armor Foil, Integran Nickel-Cobalt Nano Foil, as well as traditional high-strength, heat-treated stainless steel 301 or 420 grade foil, all available from specialty suppliers such as Nikken Steel, Comet Metals, or Ulbrich Stainless Steels for example.

Curved laminate portion 310 on FIG. 4 may be formed by any conventional method, such as pressing metal layers 312 and rubber layers 314 together at elevated temperatures, and/or by bonding metal layers 312 and rubber layers 314 together with a suitable adhesive. Suitable conventional high temperature adhesives are commercially available from suppliers such as Cilbond, Lord (Chemlok brand), and Dow Chemicals (Thixon and Megiun brands). A suitable adhesive product may be chosen to suit the characteristics of the rubber/elastomeric material selected for rubber layers 314. For example, Chemlok 607 is a suitable adhesive for FSR material, while Chemlok 207 primer and Chemlok 6450 top coat is a suitable adhesive for NBR or HNBR. Optimized chemical formulas for such products coincide with the polymer families and compounding mixtures typically found for each category of rubber/elastomer material. The consistency of the adhesive bonding is optimized through heating and pressing steps in manufacture.

As noted above, curved laminate portion 310 on FIGS. 3 and 4 is shaped to mate with pins 107 on input shaft adapter 105. A series of conventional cylindrical press dies may be used to shape metal layers 314 to the designed curvatures. Dies with less curvature must be used for metal layers 314 further away from the interface with pins 107 in order to maintain an overall uniform radial thickness of the finished curved laminate portion 310. The total overall radial thickness of finished curved laminate portion 310 will advantageously be optimized for the operating parameters of the transmission being designed. However, it is expected that curved laminate portions 310 deployed in many applications will have overall radial thicknesses in a range from 0.030" to 0.250".

Construction of curved laminate portion 310 is conventional. Calendared rubber layers 314, in strip form, are interposed between calendared metal layers 312, each rubber layer 314 having initially been cut to a suitable length and width to cover the interface between each adjacent metal layer 312. The length of rubber layers 314 may be the same or slightly longer than the arc length of the adjacent metal layers 312. The assembled metal and rubber layers 312 and 314 may be held together with adhesive, if desired, and then placed into a forming mold. An adhesive may be particularly desirable if rubber layers 314 were pre-cured prior to assembly. The assembly is then heated and cured in the mold, under pressure, to activate the final rubber curing and bonding reactions of the rubber and adhesive systems.

Referring now to FIG. 3, torsional bearing 300 also provides flat laminate portion 320. As noted above, torsional bearings 300 are shaped to be received in an interposed relationship between pins 107 on input shaft adapter 105, and the side walls of receptacles 207 on output shaft adapter 205. In this interposed relationship, the side walls of receptacles 207 contact flat laminate portion 320. It will be appreciated from FIG. 3 that flat laminate portion 320 is comprised of metal layers and rubber layers similar to metal layers 312 and rubber layers 314 within curved laminate portion 310.

The disclosure immediately above describing currently preferred materials and construction of curved laminate portion 310 applies similarly to the corresponding currently preferred materials and construction of flat laminate 320. Rectangular metal layers can be cut from metal foils using cutting dies, laser or other conventional foil cutting techniques. Calendared rubber in strip form is cut to size to give optimum coverage and overlap of the metal layers. An adhesive may be used to assemble alternating rubber and metal layers. The assembly is loaded into a mold and cured under heat and pressure.

Regarding thicknesses in flat laminate 320, the disclosure above describing currently preferred thicknesses of metal layers 312 and rubber layers 314 in curved laminate portion 310 applies equally to the currently preferred thicknesses of corresponding metal and rubber layers in flat laminate 320. As to overall laminate thickness of flat laminate 310, thicknesses in the range of 0.020" to 0.250" are preferred, although the scope of this disclosure is not limited in this regard.

Referring again to FIG. 3, metal portion 302 on torsional bearing 300 separates curved laminate portion 310 and flat laminate portion 320. Metal portion 302 is made from a conventional high strength plain carbon steel such as high strength grade 4340, or a high strength low alloy steel such as 300M. Alternatively, a high strength martensitic alloy steel may be used, such as Aermet 100.

It will be seen from FIGS. 3 and 2A that the side elevation of torsional bearing 300 is shaped to be received into output shaft adapter receptacles 207 by virtue of a generally asymmetric trapezoidal profile that includes flat laminate portion 320. Such asymmetric trapezoidal profile achieves several advantages, including (1) maximizing the cross-sectional area of flat laminate portion 320 so as to transmit and distribute torque through torsional bearing 300 with reduced compressive stress and shear stress on the materials in the construction of flat laminate portion 320, and (2) creating a self-immobilizing "dovetail" shape when retained in output shaft adapter receptacles 207 by input shaft adapter pins 107 (see FIGS. 2A and 2B).

As noted above in the "Summary" section, and with reference to FIGS. 1A and 1B, even though the input shaft 101 and output shaft 201 are misaligned in service, there is no relative movement during torque transmission between (1) contact surfaces between pins 107 and curved laminate portions 310, and (2) contact surfaces between flat laminate portions 320 and receptacles 207. Flex in the curved and flat laminate portions 310 and 320 of torsional bearings 300 takes up and absorbs substantially all relative displacement of input shaft 101 and output shaft 201 due to shaft misalignment. To that end, embodiments may provide curved and flat laminate portions 310 and 320 that are bonded with adhesive to their corresponding bearing surfaces on pins 107 and receptacles 207. Suitable adhesives are described above in the discussion of the construction of torsional bearings 300.

Figure 5:
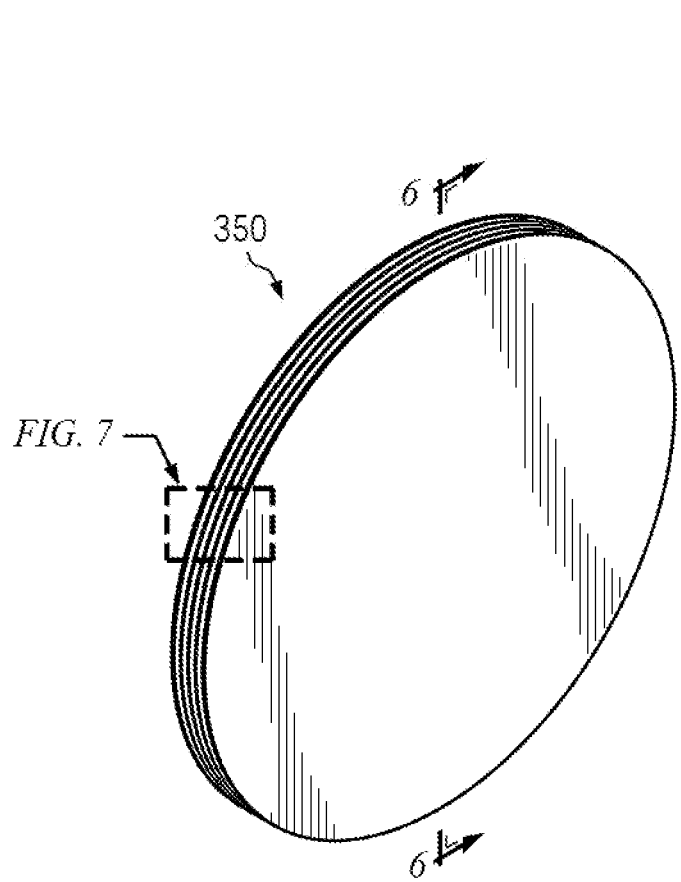

FIG. 5 is a perspective view of spherical bearing 350. With momentary reference to FIGS. 1A through 1C, it will be seen that spherical bearing 350 acts as thrust bearing, absorbing compressive and shear forces at the point at which the tip of input shaft adapter 105 contacts output shaft adapter 205 inside cylindrical recess 206. Spherical bearing receptacle 209 is provided inside output shaft adapter 205, and is positioned and shaped to mate with spherical bearing 350 when input shaft adapter pins 107 and torsional bearings 300 are fully received and operationally engaged within output shaft adapter receptacles 207.

FIG. 5 depicts spherical bearing 350 as a dome-shaped laminate of alternating metal and rubber layers. More colloquially, preferred embodiments of spherical bearing 350 have a general "contact lens" shape. With momentary reference to FIGS. 1A and 1B, for example, spherical bearing 350 allows a large thrust load to be transmitted through from input shaft assembly 100 to output shaft assembly 200 while also allowing a small angle of deflection. It will be appreciated that spherical bearing 350 obviates metal-to-metal contact between the tip of input shaft adapter 105 and output shaft adapter 250 responsive to the thrust load.

Figure 7:
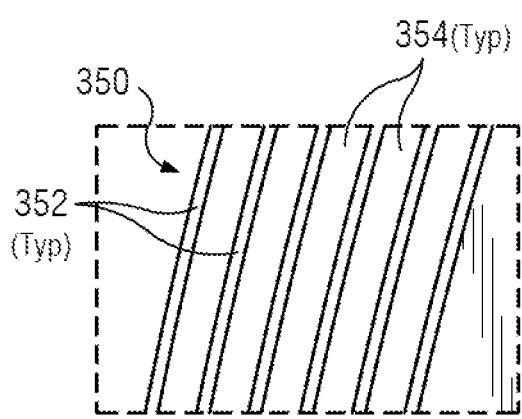
Figure 6:
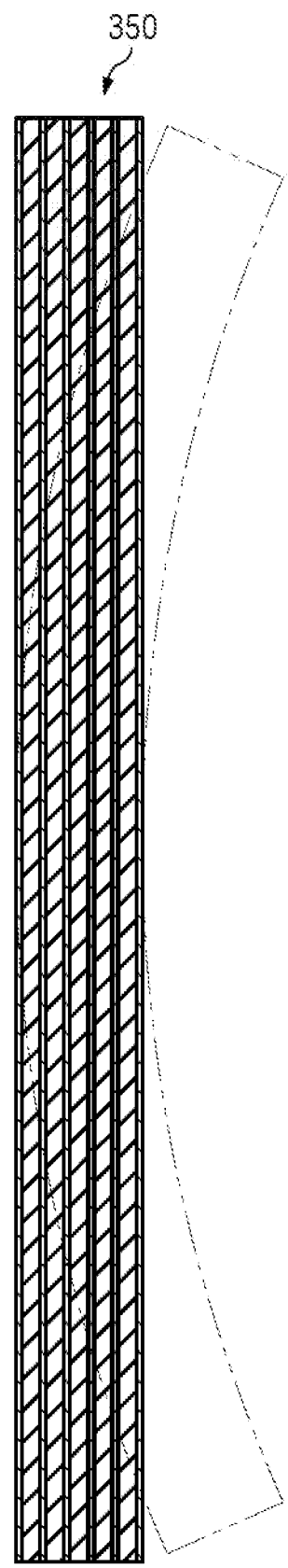

Spherical bearing 350 is similar in materials and construction to curved and flat laminate portions 310 and 320 on torsional bearings 300, as described above. FIG. 6 is a section as shown on FIG. 5, and illustrates preferred embodiments of spherical bearing 350 to be of substantially uniform laminate thickness. FIG. 7 is an enlargement as shown on FIG. 5, and depicts spherical bearing 350 to comprise alternating metal layers 352 and rubber layers 354. As described above with respect to metal layers 312 and rubber layers 314 on torsional bearings 300, FIG. 7 depicts a metal layer 352 as the immediate contact interface with input shaft adapter 105 on one side, and with spherical bearing receptacle 209 on the other side. Other embodiments may provide a rubber layer 354 as the immediate contact interface on either or both sides. It has been found advantageous to provide rubber layer 314 as the immediate contact interface with pins 107 in deployments where adhesive is used to adhere spherical bearing 350 to input shaft adapter 105 and/or spherical bearing receptacle 209 during assembly.

Currently preferred embodiments of individual metal layers 352 and rubber layers 354 on spherical bearing 350 may preferably have individual thicknesses consistent with the thickness ranges described above with respect to metal layers 312 and rubber layers 314 on torsional bearings 300, although the scope of this disclosure is not limited in this regard. Currently preferred embodiments of overall laminate thicknesses of spherical bearing 350 are in the range of 0.040" to 0.500".

Currently preferred embodiments of individual metal layers 352 and rubber layers 354 on spherical bearing 350 may preferably be made of materials consistent with the materials and constructions described above with respect to metal layers 312 and rubber layers 314 on torsional bearings 300, although the scope of this disclosure is not limited in this regard. In currently preferred embodiments, fabrication of spherical bearings 350 utilizes a series of spherical dies where each individual metal layer 352 is pressed to a custom curvature in register with its neighboring metal layers 352, so that a uniform thickness of rubber layers 354 and a constant overall thickness can be maintained throughout spherical bearings 350. Rubber layers 354 can be pre-formed in a die press with suitable spherical curvature, or cut to a geometrical shape that avoids overlapping material folds during assembly.

It will be appreciated that similar to the discussion above with respect to torsional bearings 300, and with reference to FIGS. 1A and 1B, there is no relative movement during torque transmission between (1) contact surfaces between the tip of input shaft adapter 105 and spherical bearing 350, and (2) contact surfaces between spherical bearing 350 and spherical bearing receptacle 209, even though the input shaft 101 and output shaft 201 are misaligned in service. Flex in spherical bearing 350 takes up and absorbs substantially all relative displacement of input shaft 101 and output shaft 201 due to shaft misalignment and/or thrust load during service. To that end, embodiments may provide a spherical bearing 350 that is bonded with adhesive to its corresponding bearing surfaces on the tip of input shaft adapter 105 and spherical bearing receptacle 209. Suitable adhesives are described above in the discussion of the construction of torsional bearings 300.

FIG. 8 is a partially exploded view of input shaft assembly 100, torsional bearings 300 and spherical bearing 350 immediately before (with reference to FIG. 1A) insertion into output shaft adapter 205 during assembly.

Figure 12:
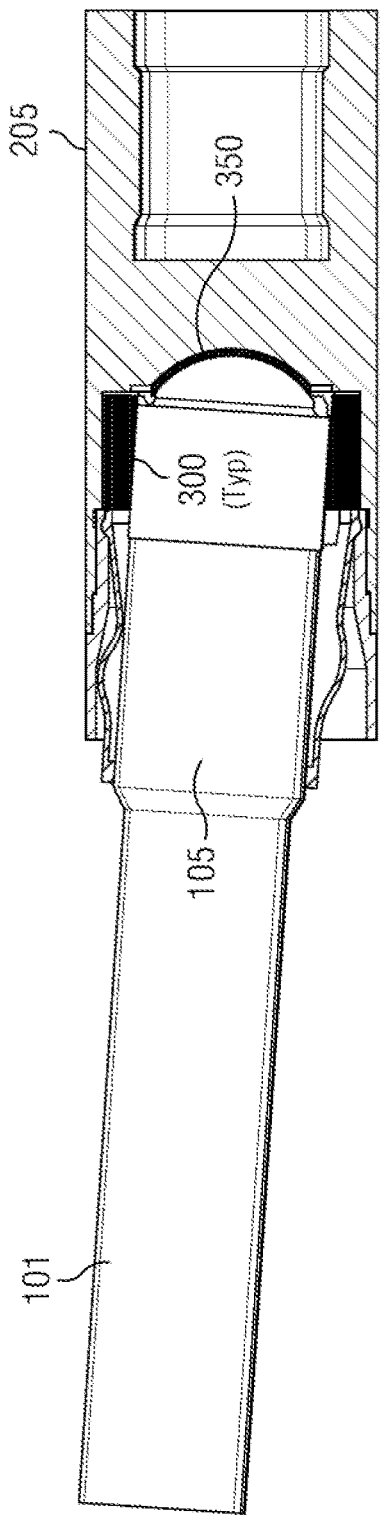

FIG. 9 is a partially exploded view of FIG. 1A (without the cutout shown on FIG. 1A). FIG. 10 is an elevation view of FIG. 1A (without the cutout shown on FIG. 1A). FIG. 11 is a section as shown on FIG. 10, and FIG. 12 is a modified version of FIG. 11 showing transmission misalignment.

FIGS. 9 and 11 are useful to describe aspects of currently preferred assembly methods of the components shown on FIGS. 1A through 1C (and FIGS. 9 and 11). Boot retainer 215 and boot 214 are received over input shaft adapter 105. Note the smallest inside diameter of boot retainer 215 should be greater than max pin nose diameter 109 in order for boot retainer 215 to slide over. Boot retainer 215 and boot 210 are then moved temporarily down/along input shaft 101 while assembly continues. Alternatively, boot retainer 215 may be provided in two halves and assembled over input shaft 101 if the smallest inside diameter of boot retainer 215 is designed to be less than max pin nose diameter 109. Adhesive is applied as desired to the bearing surfaces of pins 107, curved laminate portions 310 of torsional bearings 300, receptacles 207, flat laminate portions 320 of torsional bearings 300, tip of input shaft adapter 105, spherical bearing 350 and spherical bearing receptacle 209. Input shaft assembly 100 is assembled (refer FIG. 8) and inserted into output shaft assembly 200. Pressure is applied before heating the assembled pieces to 300 deg F for 30-90 mins to cure the adhesive.

With reference now to FIGS. 1A though 1C and FIGS. 9 and 11 again, boot 210 and boot retainer 215 are slid into position where seal lip 212 locks into its groove on boot retainer 215 and metal strap 214 is tightened down to hold boot 210 to input shaft adapter 105. Boot retainer 215 is screwed down onto output shaft adapter 205 via threads 217. It will be appreciated from FIG. 11 that when fully screwed down, boot retainer 215 forces the distal end of boot 210 (near seal lip 212) onto input shaft adapter 105. A suitable adhesive and/or an additional metal strap may also be used to secure the distal end of boot 210 to input shaft adapter 105. A suitable adhesive may also be applied to secure seal lip 212 to boot retainer 215.

FIG. 11 also illustrates radius "r" of spherical bearing 350. In currently preferred embodiments, "r" is selected to have a center point that coincides with the midpoint of pins 107 as deployed on input shaft adapter 105. FIG. 11 further illustrates fill port 221 and evacuate port 223 for lubricant in alternative embodiments in which input shaft assembly 100 and output shaft assembly are a sealed unit. See discussion of "variations" immediately below regarding such sealed unit embodiments. It will be therefore seen with reference to embodiments illustrated on FIG. 11 that output shaft adapter 205 has an outer output shaft adapter periphery on the first end thereof (towards input shaft 101). Fill port 221 connects the outer output shaft adapter periphery to the recess provided by spherical bearing receptacle 209 in output adapter shaft 205. [Refer to description above associated with FIG. 1C for further understanding of the recess provided by spherical bearing receptacle 209 in output adapter shaft 205.] Evacuate port 223 also connects the outer output shaft adapter periphery to the recess provided by spherical bearing receptacle 209 in output adapter shaft 205. Fill port 221 and evacuate port 223 may be sealed as required with suitable tapered pipe plugs. Evacuate port 223 may be used in conjunction with a conventional vacuum pump: (1) during filling through fill port 221, to evacuate lubricant chamber in order to vacuum-assist distribution of lubricant throughout the chamber, and (2) to remove lubricant from throughout the chamber during lubricant purge. FIG. 11 further illustrates that in some embodiments, adhesive bonding 357, 358 may be provided between at least one of: (1) the laminate portion of spherical bearing 350 and the tip provided by shaft adapter 105; and/or (2) the laminate portion of spherical bearing 350 and the recess provided by spherical bearing receptacle 209 in output adapter shaft 205 (although the scope of this disclosure is not limited in either of these regards).

FIG. 12 illustrates the flex of torsional bearings 300 and spherical bearing 350 during transmission misalignment.

Variations on Laminated Bearings Embodiments

Currently preferred embodiments envisage three (3) to eight (8) torsional bearings 300 equally spaced around input shaft adapter 105. This disclosure is not limited in this regard, however, and any number of bearings could be deployed. Within currently preferred embodiments, four (4) to eight (8) pins are more preferred, with four (4) to six (6) pins used on 4.75" to 6.75" shaft sizes, and eight (8) pins used on larger sizes.

Embodiments of the disclosed transmission may run as a sealed assembly with grease or oil lubrication. Refer to disclosure above with reference to FIG. 11. Because the internal components in the laminated bearings embodiments described herein are configured to avoid metal-to-metal sliding contact, however, other embodiments may be left unsealed, and may be further optimized for mud compatibility in such unsealed state.

Embodiments of the disclosed transmission may be combined with several types of thrust and tension socket devices to control the thrust load of the rotor. The scope of this disclosure is not limited in this regard. For example, and without limitation, a thrust surface and tension rod coupling could be provided instead of the spherical bearing 350 as received into spherical bearing receptacle 209 as described above.

Embodiments of the disclosed torsional bearings 300 may also be combined with other, alternative transmission designs transmitting torque between misaligned or angularly displaced shafts, such as, for example, universal joint designs, CV joint designs, claw joint designs or knuckle joint designs. Deployment of embodiments of the disclosed torsional bearings 300 on such alternative transmission design may provide advantages as described above in this disclosure, including improving the operational torque transfer efficiency and life cycle in such alterative designs.

In particular, without limiting the preceding paragraph, the double knuckle transmission coupling disclosed in U.S. Published Patent Application 2017/0045090 (applicant Lord Corporation of Cary, North Carolina, U.S.A) is considered highly suitable for modification to include embodiments of torsional bearings 300 as described in this disclosure. In this regard, the following Figures and paragraphs of the written specification of 2017/0045090 are incorporated into this disclosure by reference as if fully set forth herein: (1) FIGS. 2 through 21B of 2017/0045090; and (2) paragraphs 0004 through 0028, paragraphs 0038 through 0050, and paragraphs 0053 and 0054 of 2017/0045090.

For example, referring to FIGS. 6, 7, 8, 9, 11 and 12 in 2017/0045090 and associated narrative, the interfaces between couple center element 404 and input yoke 402/output yoke 406 may be adapted to receive embodiments of torsional bearings 300 as described in this disclosure. In more detail, arcuate recesses 432 on input yoke 402 and arcuate recesses 443 on output yoke 406 in 2017/0045090 may be adapted to provide shaped receptacles, and then torsional bearings 300 may be provided in such shaped receptacles. The curvatures on curved laminate portions 312 on torsional bearings 300 (referring to FIG. 3 herein) may preferably be selected to match corresponding curvatures on arcuate recesses 432, 443 on input yoke 402/output yoke 406 in 2017/0045090. Knuckles 411 on couple center element 404 will then bear on curved laminate portions 312 of torsional bearing 300 (referring to FIG. 3 herein) when input yoke 402, output yoke 406 and couple center element 404 are assembled. Resilient bearing contact could thereby be provided at the interfaces between couple center element 404 and input yoke 402/output yoke 406. Such an adaptation may thus provide many of the same advantages described above in this disclosure to the double knuckle coupling described in 2017/0045090. Further, the shaped receptacles provided in arcuate recesses 432, 443 in 2017/0045090 may receive torsional bearings 300 snugly such that flat laminate portions 320 on torsional bearings 300 (again referring to FIG. 3 herein) provide further resilient bearing contact between couple center element 404 and input yoke 402/output yoke 406.

Alternatively and/or additionally, laminated bearings may be provided at torque transfer interfaces between faces 416 on couple center element 404 in 2017/0045090 when couple center element 404 is received within slots 436, 439 on input yoke 402/output yoke 406.

Some embodiments of the adaptation described in the preceding paragraph (hereafter, "double knuckle coupling adaptation") may have contact surfaces adhesively bonded as described above in this disclosure. Some embodiments of the double knuckle coupling adaptation may be open to mud flow, and others may be protected from mud flow. Some embodiments of torsional bearings 300 deployed in the double knuckle coupling adaptation may have curved faces provided thereon, so that when received in the shaped receptacles, torsional bearings 300 are flush with the outer surfaces of input yoke 402 and output yoke 406. In some embodiments of the double knuckle coupling adaptation, torsional bearings 300 may be provided in all occurrences of the interfaces between couple center element 404 and input yoke 402/output yoke 406. In other embodiments, torsional bearings 300 may be provided in selected ones of such interfaces.

Unlaminated Bearings Embodiments

The scope of this disclosure is not limited to laminated bearings embodiments such as torsional bearings 300 and spherical bearings 350 described above with reference to FIGS. 1 through 12. Selected bearings may be unlaminated (or "monolithic") bearings. Selected unlaminated bearing materials could also include, without limitation, polymer, plastic or metals. Preferably, unlaminated bearings described in this disclosure have the "bridge"-style shape. However, selected unlaminated bearing shapes could also include, without limitation, flat, spherical, cylindrical or chevron shapes.

Figure 13A:
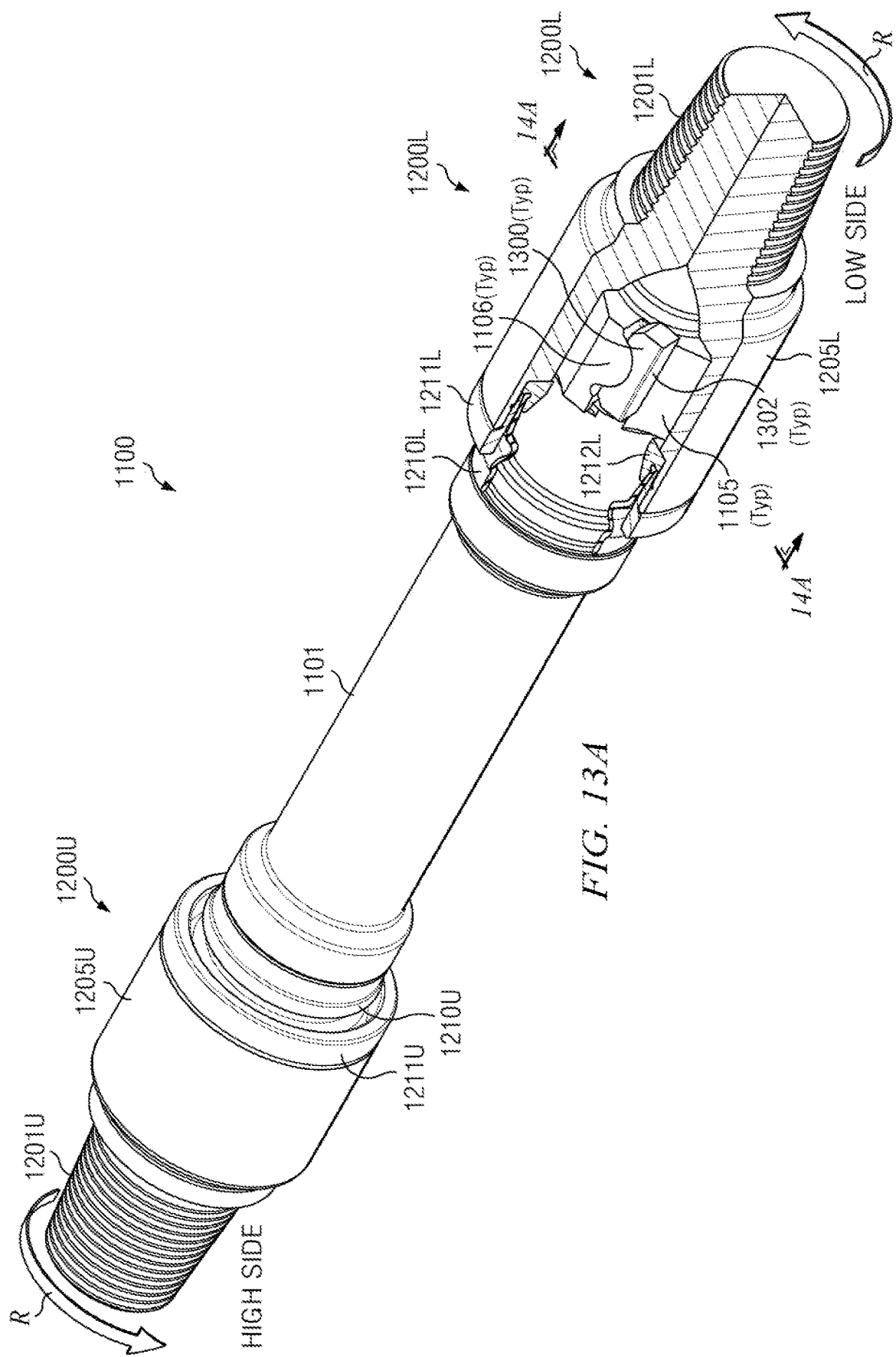
Figure 20A:
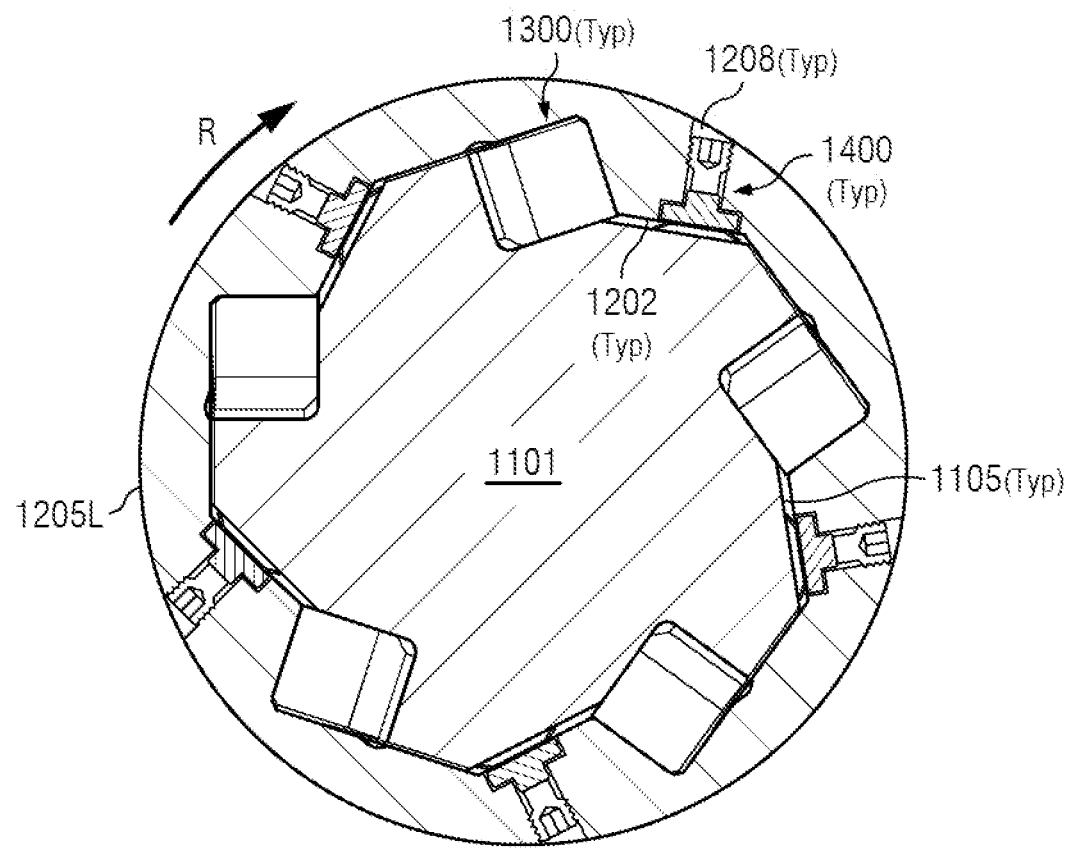
FIG. 20A is a section similar to FIG. 14A, except depicting an alternative embodiment including backlash energizer assembly 1400.

The unlaminated bearings embodiments described below with reference to FIGS. 13A and 20A are referred to as "Torque Transfer Elements" (TTEs) in order to provide a different nomenclature in this disclosure from the laminated bearings embodiments described above with reference to FIGS. 1 through 12. As described above, laminations in laminated bearings embodiments (such as torsional bearings 300 and spherical bearings 350 on FIGS. 1 through 12) are disposed to "flex" during misaligned (articulated) shaft rotation. By contrast, unlaminated bearings (or TTEs), embodiments of which are described below with reference to FIGS. 13A though 20H, are disposed to slide and displace within pockets (or "housing cavity receptacles") provided in the internal periphery of the housing in which the articulating shaft is received. As the shaft "tilts" about its untilted axial centerline during misaligned (articulated) rotation, curved bearing surfaces on shaft pins slidably rotate against corresponding curved bearings surfaces on the TTEs as received in the housing cavity receptacles. Further, substantially flat surfaces on the TTEs are disposed to slidably displace against corresponding bearing surfaces on the housing cavity receptacles as the shaft tilts and the curved bearing surfaces on the shaft pins slidably rotate against curved bearing surfaces on the TTEs. The sliding displacement of TTEs with respect to the housing cavity receptacles during articulated rotation is in a direction generally parallel to the shaft's untilted axial centerline. Preferably, the curved bearing surfaces on the shaft pins are convex, and the curved bearing surfaces on the TTEs are concave, although the scope of this disclosure is not limited in this regard.

Reference is now made to FIGS. 13A through 20H in describing currently preferred transmission embodiments including unlaminated torsional bearings. For the purposes of the following disclosure, FIGS. 13A through 20H should be viewed together. Any part, item, or feature that is identified by part number on one of FIGS. 13A through 20H will have the same part number when illustrated on another of FIGS. 13A through 20H. It will be understood that the embodiments as illustrated and described with respect to FIGS. 13A through 20H are exemplary, and the scope of the inventive material set forth in this disclosure is not limited to such illustrated and described embodiments.

As noted above, the scope of the inventive material set forth in this disclosure is not limited to specific deployments of the described embodiments. For example, the following description directed to unlaminated embodiments makes reference to upper and lower housing assemblies 1200U, 1200L each operationally engaged with shaft assembly 1100 at opposing ends thereof. These embodiments reflect a typical BHA deployment. The description below is not limited to such an exemplary deployment, however.

Figure 16:
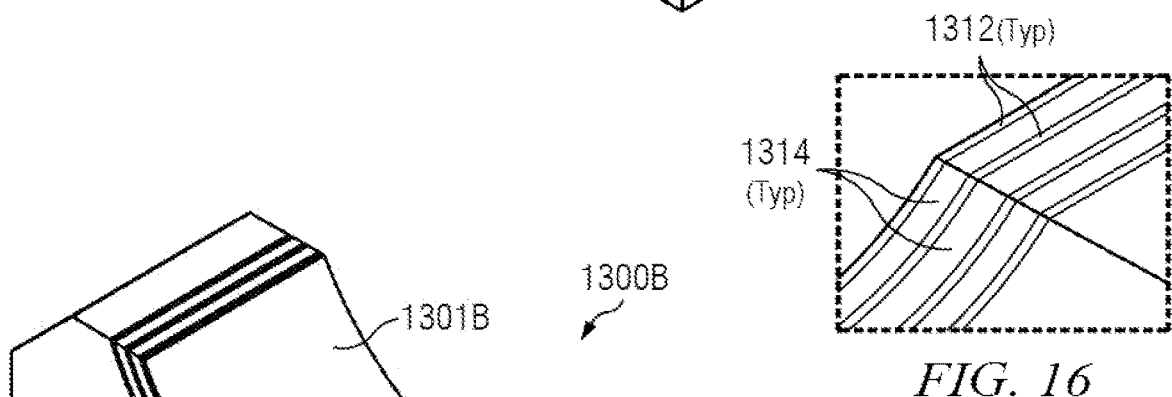
Figure 17:
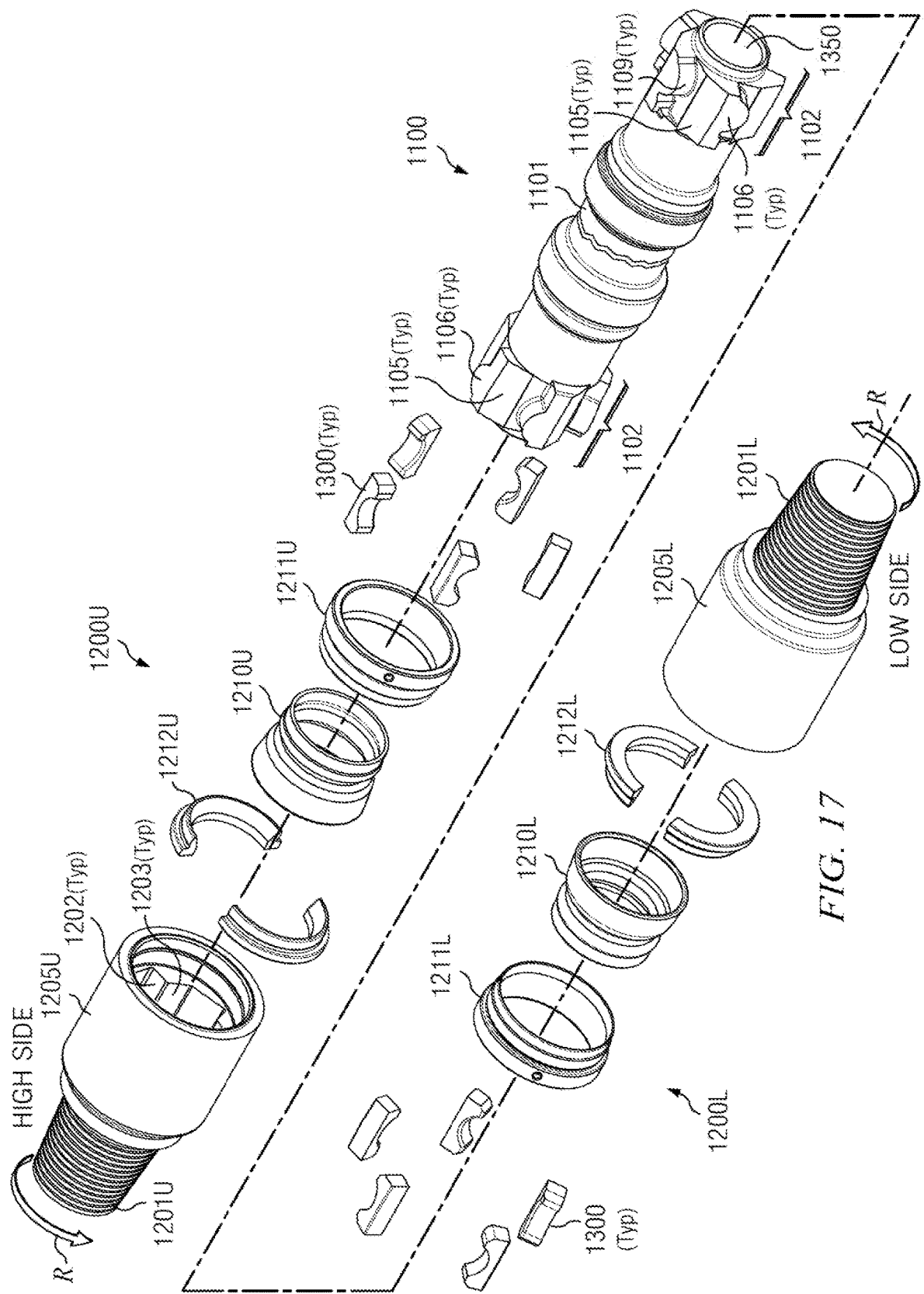

FIG. 13A is a partial cutaway and exploded view of an exemplary transmission embodiment according to this disclosure in which upper housing assembly 1200U is rotatably connected to lower housing assembly 1200L via misaligned (articulated) rotation of shaft assembly 1100. FIG. 17 is a fully exploded view of the transmission embodiment shown on FIG. 13A. Generally on FIGS. 13A and 17, applied torque is shown transmitted from upper housing assembly 1200U into shaft assembly 1100, and then into lower housing assembly 1200L. A general convention is followed throughout the embodiments illustrated on FIGS. 13A through 20H, in which applied torque is disposed to follow shaft rotation in a clockwise direction looking downhole from an illustrated "high side" (see notation near upper housing assembly 1200U on FIGS. 13A and 17) to an illustrated "low side" (see notation near lower housing assembly 1200L). This convention follows the generally accepted subterranean drilling convention of "clockwise rotation looking downhole". In particular, this convention follows the general convention of configuring the rotor of a positive displacement motor ("PDM" or "mud motor") to rotate a shaft in a clockwise direction looking downhole.

It will be understood, however, that the scope of this disclosure is not limited to embodiments following the "clockwise rotation looking downhole" convention for rotation and torque. Alternative embodiments, not illustrated, configured to transmit applied torque in a counterclockwise direction looking downhole are within the scope of this disclosure. Persons of ordinary skill in this art will require very little experimentation to adapt the embodiments illustrated on FIGS. 13A through 20H of this disclosure to transfer applied torque in the opposite direction from the direction illustrated. In many cases, it will require no more than reversing orientations of illustrated components or creating "minor images" of illustrated assemblies.

FIGS. 13A and 17 should be viewed together for a more detailed understanding of applied torque transmission from upper housing assembly 1200U into shaft assembly 1100, and then into lower housing assembly 1200L. Upper housing assembly 1200U includes upper housing 1205U, which in turn includes upper housing threads 1201U provided on one end thereof. Upper housing threads 1201U are preferably configured to mate with an adapter ultimately connected rotatably to a PDM rotor, although the scope of this disclosure is not limited any particular component with which upper housing threads 1201U may be configured to mate. Shaft rotation direction R on FIGS. 13A and 17 illustrates clockwise rotation of upper housing assembly 1200U looking downhole, consistent with the corresponding general convention of configuring a PDM rotor to rotate clockwise looking downhole, as described above.

Lower housing assembly 1200L includes lower housing 1205L, which in turn includes lower housing threads 1201L provided on one end thereof. Lower housing threads 1201L are preferably configured to mate with a motor bearing mandrel or drive shaft ultimately connected to a rotary bit, although the scope of this disclosure is not limited any particular component with which lower housing threads 1201L may be configured to mate. Shaft rotation direction R on FIGS. 13A and 17 further illustrates clockwise rotation of lower housing assembly 1200L looking downhole, consistent with the corresponding general convention of configuring a PDM rotor to rotate clockwise looking downhole, as described above.

FIGS. 13A and 17 show upper and lower housings 1205U, 1205L as hollow, with internal receptacles and surfaces formed therein according to Figures and detailed description set forth below. FIGS. 13A and 17 further show that shaft assembly 1100 provides a shall head 1102 at each end of shaft 1101. As will be described in more detail further below, each shaft head 1102 is configured to be received into a corresponding one of upper and lower housings 1205U, 1205L and, when received therein, to interface with receptacles and surfaces formed internally on upper and lower housings 1205U, 1205L. As seen on FIGS. 13A and 17, each shaft head 1102 provides a preselected number of shaft pins 1106. Shaft pins 1106 are preferably spaced equally in radial disposition around shaft head 1102, although the scope of this disclosure is not limited to equi-spaced radial disposition. Five (5) shaft pins 1106 are provided on each shaft head 1102 in the embodiments illustrated on FIGS. 13A through 20H, although again the scope of this disclosure is not limited to any particular number of shaft pins 1106 per shaft head 1102. Other embodiments (not illustrated) may provide shaft heads with other numbers of shaft pins, and/or with other than equi-spaced radial disposition. Other embodiments (not illustrated) may also provide a number and spacing configuration of shaft pins on a shaft head at one end of a shaft that differs from the number and spacing configuration of shaft pins at the other end of the shaft.

FIG. 17 illustrates each shaft pin 1106 preferably providing a curved shaft pin bearing surface 1109 and a shaft backlash surface 1105. The curved shaft pin bearing surface 1109 on one shaft pin 1106 generally faces the shaft backlash surface 1105 of a neighboring shaft pin 1106.

FIGS. 13A and 17 further illustrate Torque Transfer Elements ("TTEs") 1300 interposed between shaft pins 1106 and upper and lower housings 1205U, 1205L when shaft heads 1102 are received into upper and lower housings 1205U, 1205L. Preferably, one (1) TTE 1300 is provided for each shaft pin 1106, as depicted in the embodiments illustrated throughout FIGS. 13A through 20H in this disclosure. It will nonetheless be appreciated that the scope of this disclosure is not limited in this regard, and other embodiments may provide some shaft pins without TTEs, or some shaft pins with laminated torsional bearings (embodiments of which are described above in this disclosure with reference to FIGS. 1 through 12).

FIGS. 13A and 17 further illustrate: Upper and lower boots 1210U, 1210L; upper and lower boot retaining rings 1211U, 1211L; and upper and lower split rings 1212U, 1212L. Boots 1210U/L, boot retaining rings 1211U/L and split rings 1212U/L advantageously seal the connection between shaft 1101 and upper and lower housings 1205U, 1205L at either end of shaft 1101. Boots 1210U/L are preferably made of a rubber or elastomer material in order to provide seals while at the same time permitting independent articulation between shaft 1101 and upper housing 1205U at one end of shaft 1101, and between shaft 1101 and lower housing 1205L at the other end of shaft 1101.

From this point forward in the discussion of FIGS. 13A through 20H, the Figures and associated disclosure will describe features, aspects and alternative embodiments with reference to assemblies at the "low side" as drawn on FIGS. 13A and 17. That is, the Figures and associated disclosure will describe features, aspects and alternative embodiments in and around and associated with lower housing assembly 1200L as depicted on FIGS. 13A and 17. Persons of ordinary skill in this art will require very little experimentation to reverse the orientation of embodiments illustrated with reference to the "low side" on FIGS. 13A and 17 in order to understand corresponding assemblies and features on the "high side".

FIG. 13B is a perspective view of lower housing 1205L on FIG. 13A in isolation. FIG. 13C is a section as shown on FIG. 13B. FIG. 13B shows that lower housing 1205L is generally hollow, providing housing cavity 1206 formed therein. FIG. 13C shows housing cavity receptacles 1207 provided in lower housing 1205L generally at a periphery of housing cavity 1206. With momentary reference to FIGS. 13A and 17, it will be appreciated that lower housing 1205L provides one (1) housing cavity receptacle 1207 each for receiving a corresponding shaft pin 1106 on shaft head 1102. Thus, five (5) housing cavity receptacles 1207 are illustrated on FIG. 13C, one each for receiving a corresponding one of the five (5) shaft pins 1106 shown on FIG. 17.

FIG. 13C further illustrates that each housing cavity receptacle 1207 provides a housing bearing surface 1203 and a housing backlash surface 1202. FIG. 13B illustrates housing bearing surfaces 1203 and housing backlash surfaces 1202 in perspective view.

FIGS. 13B and 13C further illustrate optional hard facing 1209 inside lower housing 1205L. In embodiments where provided, hard facing 1209 assists reducing thrust wear between shaft head 1102 and lower housing 1205L during articulated/misaligned rotation of shaft head 1102 as received in lower housing 1205L. It will be understood that hard facing 1209 may optionally also be provided in upper housing 1205U. In other non-illustrated embodiments, hard facing may be provided on the tip of shaft head 1102, or a thrust bearing may be provided instead of hard facing 1209.

Figure 14A:
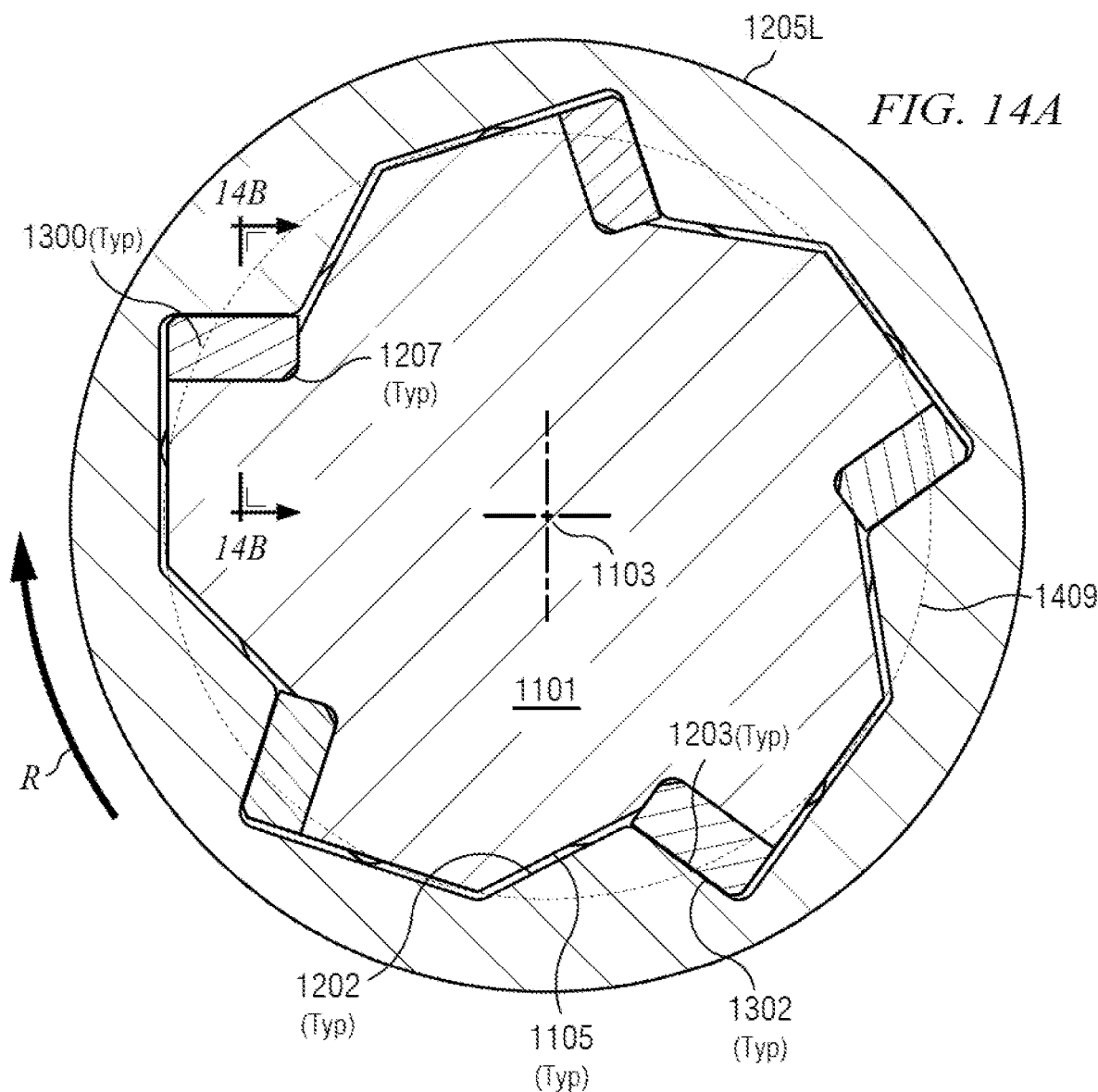
FIG. 14A is a section as shown on FIG. 13A.
Figure 14B:
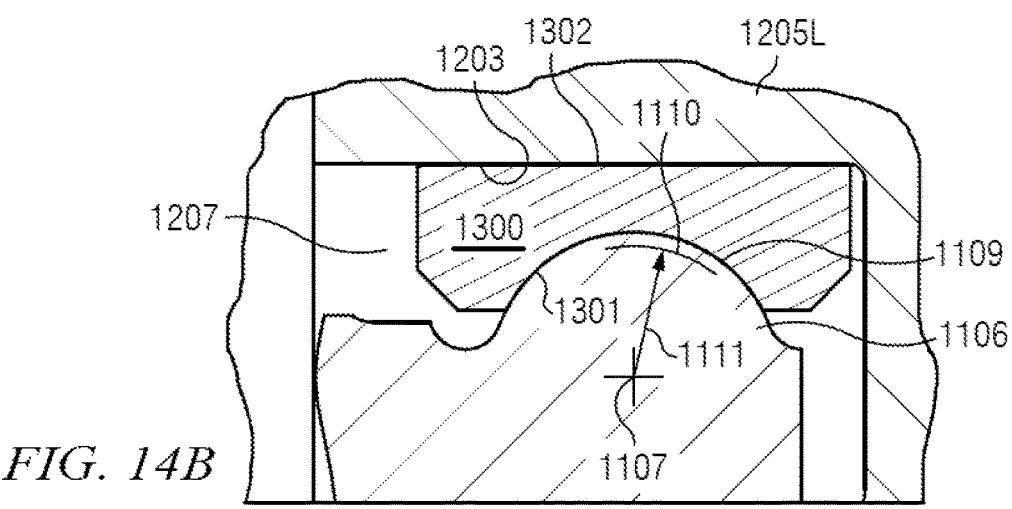
FIG. 14B is a section as shown on FIG. 14A.

FIG. 14A is a section as shown on FIG. 13A. FIG. 14B is a section as shown on FIG. 14A. FIGS. 14A and 14B show shaft pins 1106 engaged with TTEs 1300 in housing cavity receptacles 1207. Curved shaft pin bearing surfaces 1109 on shaft pins 1106 slidably engage with curved TTE pin bearing surfaces 1301. TTE housing bearing surfaces 1302 further slidably engage with housing bearing surfaces 1203. Following the convention of clockwise shaft rotation R looking downhole per FIG. 13A, FIG. 14A illustrates applied torque transfer in a clockwise direction in the following sequence: (A) from shaft pins 1106 on shaft head 1102 into TTEs 1300; and then (B) through TTEs 1300 and into lower housing 1205L via housing bearing surfaces 1203. FIGS. 14A and 14B further illustrate that during such applied clockwise torque transfer, TTE housing bearing surface 1302 bears upon housing bearing surface 1203. FIG. 14B also shows that during such applied clockwise torque transfer, curved shaft pin bearing surfaces 1109 provided on shaft pins 1106 bear upon curved TTE pin bearing surfaces 1301.

With reference now to FIG. 17, it will be understood that a reverse transfer sequence enables "applied clockwise torque transfer looking downhole" at upper housing assembly 1200U, in which torque is transferred in the following sequence: (A) from upper housing 1205U into TTEs 1300; and then (B) into shaft pins 1106 on shaft head 1102. This reverse sequence is like imagining torque transfer on FIG. 14A in the opposite direction (counterclockwise) to rotation direction R as illustrated on FIG. 14A.

With further reference now to FIGS. 14A and 14B, it will be appreciated that in currently preferred embodiments, the illustrated geometries are designed so that the maximum shaft pin diameters 1110 on shaft pins 1106 are on a locus 1409 whose diameter coincides with the external diameter of lower housing assembly 1200L at lower housing threads 1201L (such external diameter also illustrated on FIG. 14A as dotted line 1409). In this way, in such currently preferred embodiments, torque is directly transferred through the full cross-section of lower housing assembly 1200L at lower housing threads 1201L, substantially unifying the torque stress gradients across lower housing assembly 1200L at that threaded connection. It will nonetheless be appreciated, however, that the scope of this disclosure is not limited to deployments in which locus 1409 of maximum shaft pin diameters 1110 coincides with the external diameter of lower housing assembly 1200L at lower housing threads 1201L.

Additionally, as further shown on FIGS. 14A and 14B, shaft pins 1106 are free to slidably rotate about TTEs 1300 during misaligned (articulated) rotation of shaft 1101. Likewise, TTEs 1300 are free to slidably displace within housing cavity receptacles 1207 during misaligned (articulated) rotation of shaft 1101. Shaft pins 1106 are disposed to rotate about TTEs 1300 at the interface between curved shaft pin surfaces 1109 and curved TTE pin bearing surfaces 1301. TTEs 1300 are disposed to slidably displace within housing cavity receptacles 1207 at the interface between TTE housing bearing surfaces 1302 and housing bearing surfaces 1203. FIG. 14B illustrates that rotation of shaft pins 1106 about TTEs 1300 is about shaft pin centerlines 1107, and that the interface between curved shaft pin surfaces 1109 and TTE pin bearing surfaces 1301 is at shaft pin radius 1111 from shaft pin centerline 1107. FIG. 14B further shows that shaft pin radius 1111 defines the maximum shaft pin diameter 1110 for shaft pins 1106. FIGS. 13A and 14B illustrate that sliding displacement of TTEs 1300 within housing cavity receptacles 1207 is in a direction generally parallel to the shaft's untilted (undeflected) axial centerline 1103, such that the TTEs 1300 float at least generally parallel to an untilted axial shaft centerline 1103 when the 11B housing bearing surfaces 1302 slidably displace against corresponding housing bearing surfaces 1203. [Undeflected (or untilted) shaft centerline 1103 is also shown on FIG. 19B].

Figure 18:
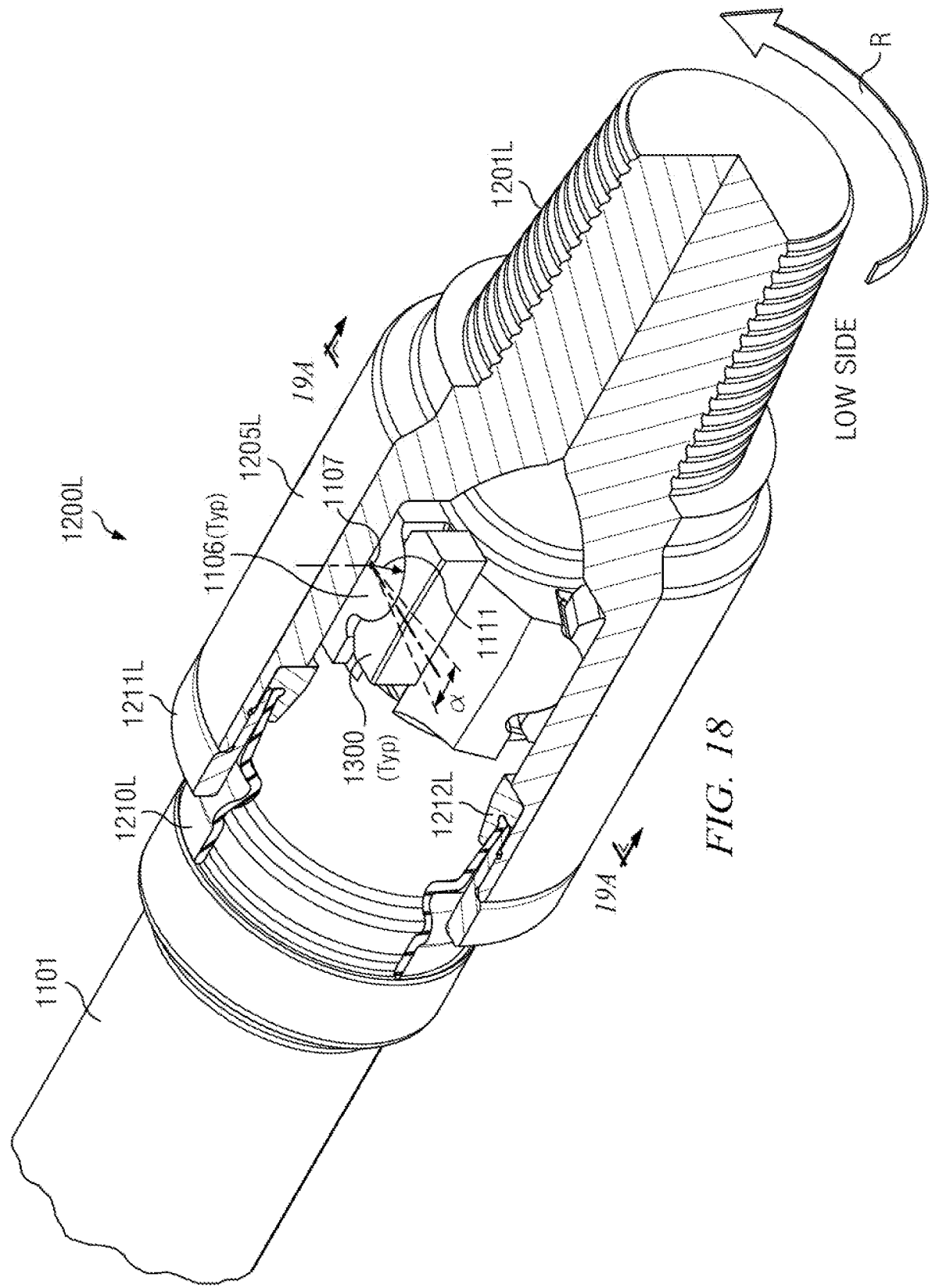
Figure 19A:
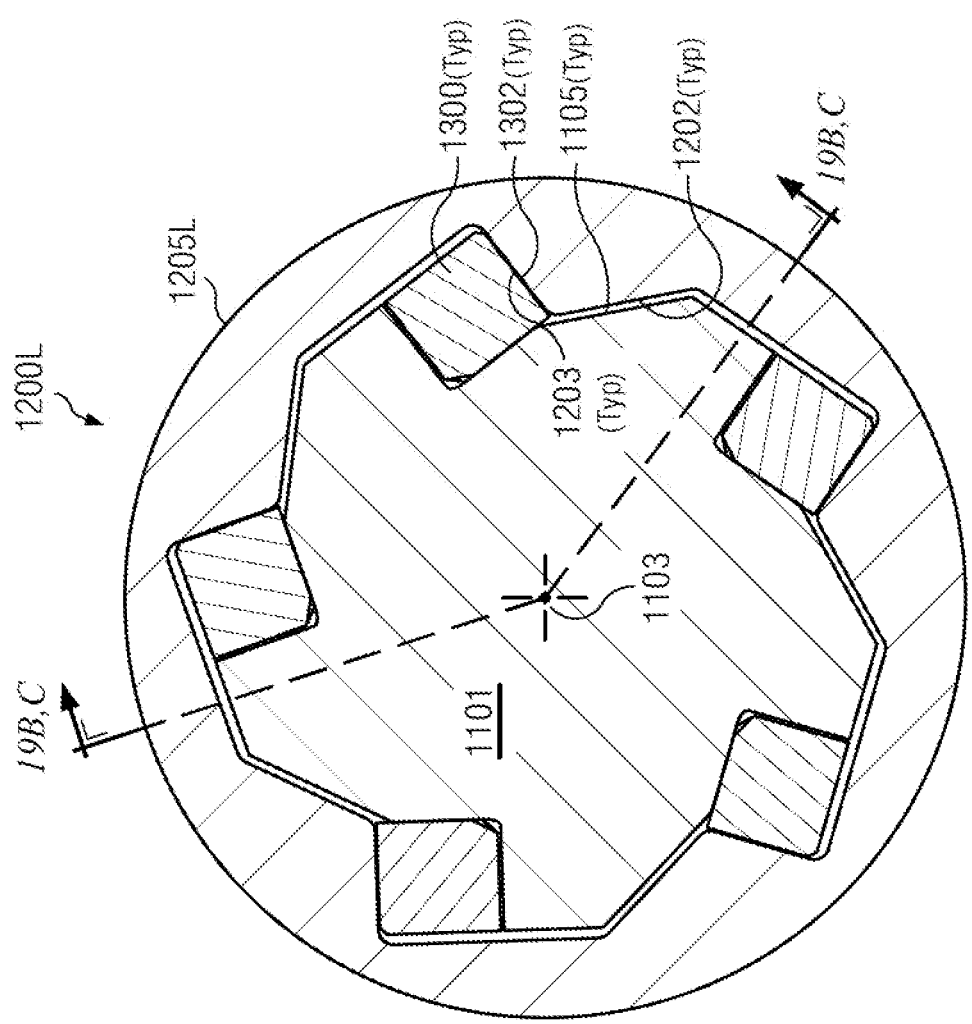
FIG. 19A is a section as shown on FIG. 18.
Figure 19B:
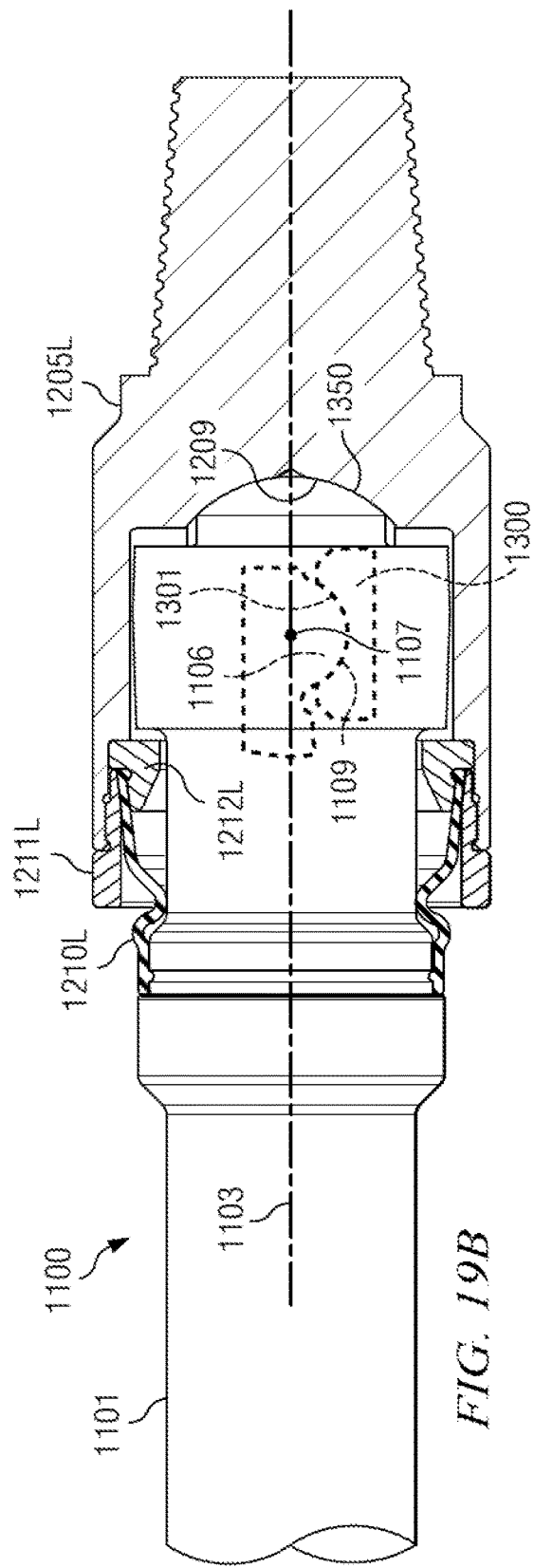
FIGS. 19B and 19C are "faux section" views as shown FIG. 19A, depicting shaft assembly 1100 substantially assembled at lower housing assembly 1200L per FIGS. 13A, 14A and 14B, in which FIGS. 19B and 19C combine to schematically depict articulation during misaligned rotation.
Figure 19C:
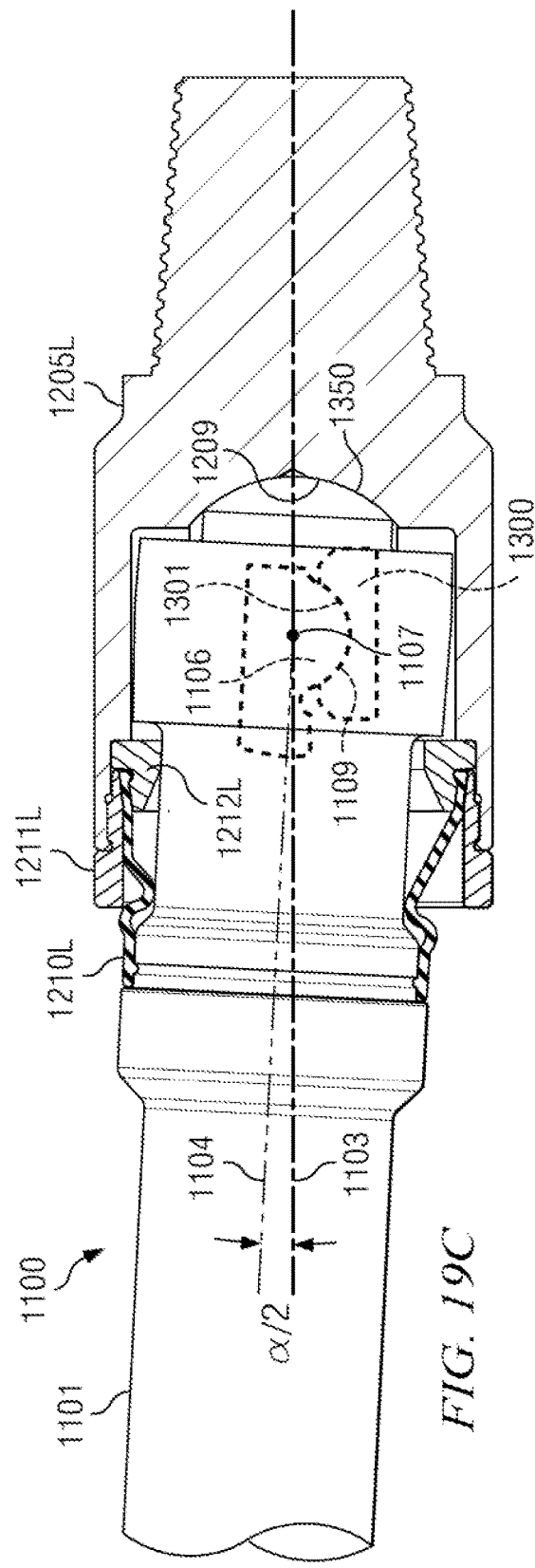

FIG. 18 is a further partial cutaway view of lower housing assembly 1200L as also illustrated on FIG. 13A. FIG. 19A is a section as shown on FIG. 18. FIGS. 19B and 19C are "faux section" views as shown FIG. 19A, depicting shaft assembly 1100 substantially assembled at lower housing assembly 1200L per FIGS. 13A, 14A and 14B, in which FIGS. 19B and 19C combine to schematically depict articulation during misaligned rotation. By "faux section" views, it will be understood from FIG. 14A, for example, that since the illustrated embodiments depict five (5) shaft pins 1106 and associated TTEs 1300 distributed evenly around the periphery of shaft head 1102, a true straight line section through the assembly of shaft assembly 1100 at lower housing assembly 1200L does not allow shaft pins 1106 on opposite sides of shaft head 1102 to be seen on one view. Thus, FIGS. 19B and 19C depict more of a "pie-shaped" or "offset" section through the assembly of shaft assembly 1100 at lower housing assembly 1200L, so that shaft pins 1106 on opposite sides of shaft head 1102 can be seen on each of FIGS. 19B and 19C.

FIG. 18 illustrates parts and features also described above with reference to FIGS. 13A, 14A and 14B, including shaft 1101, shaft pins 1106, lower housing 1205L and TTEs 1300. FIG. 18 also illustrates shaft pin centerline 1107 and shaft pin radius 1111 as previously described above with reference to FIG. 14B.

FIGS. 18, 19B and 19C should now be viewed together. FIG. 18 illustrates shaft deflection angle α disposed about shaft pin centerline 1107. Although shown disposed about shaft pin centerline 1107 on FIG. 18, FIG. 19C illustrates that shaft deflection angle α actually represents an angle of shaft deflection (or tilt, or articulation) either side of undeflected shaft centerline 1103 during misaligned rotation of shaft 1101. FIG. 19C shows that at the illustrated moment, deflected shaft centerline 1104 is angularly displaced (or "tilted") from undeflected shaft centerline 1103 by α/2, where such angular displacement (tilt) is in a first angular direction of shaft misalignment. It will be further understood that although not specifically illustrated, shaft 1101 will also be angularly deflected (tilted) by α/2 in a second angular direction of shaft misalignment during one full revolution of misaligned rotation by shaft 1101, where the first and second angular directions oppose one another either side of undeflected shaft centerline 1103. Shaft deflection angle α thus represents the combined angular deflection (tilt) of shaft 1101 in both the first and second angular directions either side of undeflected shaft centerline 1103 during one full revolution of misaligned shaft rotation.

Now comparing FIG. 19B with FIG. 19C, it will be seen on FIG. 19B that shaft 1101 is in an undeflected condition such that undeflected shaft centerline 1103 is continuous through shaft 1101 and lower housing 1205L. Shaft pin 1106 on FIG. 19B is in a "neutral" position with respect to TTE 1103. In contrast, shaft 1101 on FIG. 19C is shown in a deflected condition as described immediately above, such that deflected shaft centerline 1104 on FIG. 19C is angularly displaced (tilted) from undeflected shaft centerline 1103 by α/2. Shaft pin 1106 on FIG. 19C is also shown in a deflected condition with respect to TTE 1300. Shaft pin 1106 has rotated an angle of α/2 about shaft pin centerline 1107 with respect to TTE 1300. Likewise, curved shaft pin bearing surface 1109 on shaft pin 1106 has slidably rotated an angle of α/2 about shaft pin centerline 1107 with respect to curved TTE pin bearing surface 1301 on TTE 1300. FIG. 18 further illustrates the potential for such rotation of shaft pins 1106 about shaft pin centerline 1107 with respect to TTE 1300. FIG. 18 shows such potential for rotation by α/2 either side of an undeflected condition (as shown on FIG. 19B) for a total overall potential shaft deflection angle α.

FIGS. 19B and 19C further illustrate that TTEs 1300 remain in a generally stationary angular position while shaft pins 1106 rotate about shaft pin centerlines 1107 during misaligned rotation (tilt) of shaft 1101. However, with additional reference to FIG. 14B, it will be appreciated that TTEs 1300 are disposed (and are free) to slidably displace within housing cavity receptacles 1207 during misaligned rotation (tilt) of shaft 1101. As shaft pins 1106 rotate with respect to TTEs 1300 during tilt, TTEs 1300 are disposed (and are free) to displace within housing cavity receptacles 1207 via sliding contact between TTE housing bearing surfaces 1302 and housing bearing surfaces 1203. As described above, FIGS. 13A and 14B illustrate that such sliding displacement of TTEs 1300 within housing cavity receptacles 1207 is in a direction generally parallel to the shaft's unfilled (undeflected) axial centerline 1103, such that the TTEs 1300 float at least generally parallel to an untilted axial shaft centerline 1103 when the TTE housing bearing surfaces 1302 slidably displace against corresponding housing bearing surfaces 1203.

The foregoing description of torque transfer via unlaminated bearings (TTEs) has been made with reference to illustrated embodiments in which two housing assemblies 1200U and 1200L are provided, one at each end of shaft 1101. The scope of this disclosure is not limited, however, to two housing assemblies on shaft 1101. Other embodiments (not illustrated) may provide only one housing assembly on shaft 1101, on a selected end thereof. In such other embodiments, the scope of this disclosure is further not limited as to the selected end of shaft 1101 (high side or low side on FIG. 13A) on which the single housing assembly is to be provided.

The foregoing description of torque transfer via both laminated bearings and unlaminated bearings (TTEs) has been made with "pure" assemblies in which all bearings in one articulating assembly are either laminated or unlaminated. The scope of this disclosure is not limited, however, to such "pure" embodiments. Other embodiments (not illustrated) may include "hybrid" articulating assemblies, inside which laminated bearings arrangements (such as described herein with reference to FIGS. 1 through 12) are mixed with unlaminated bearings arrangements (such as described herein with reference to FIGS. 13A through 20H).

Referring now to FIGS. 13A and 17, it will be understood that torque backlash will be created in upper and lower housing assemblies 1200U, 1200L whenever applied torque through shaft 1101 is reduced, stopped or even reversed. Torque backlash may be momentary or sustained, responsive to corresponding changes in transmitted torque over time through shaft 1101. Under the above-described "clockwise looking downhole" convention of shaft rotation direction R on FIGS. 13A and 17, torque backlash will be in a counterclockwise direction in response to applied clockwise torque looking downhole. Torque backlash thus manifests itself on FIG. 14A, for example, in the opposite direction (counterclockwise) to the clockwise shaft rotation direction R looking downhole shown on FIG. 14A.

FIG. 14A illustrates that during torque backlash events in lower housing assembly 1200L, applied torque is no longer transferred through TTEs 1300. Instead, counterclockwise torque backlash causes shaft backlash surface 1105 to bear upon housing backlash surface 1202. Although not specifically illustrated, it will be understood that the corresponding effect occurs in upper housing assembly 1200U.

Figure 20B:
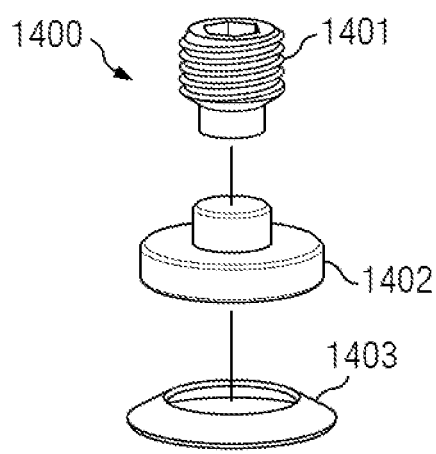
FIG. 20B is an exploded view of backlash energizer assembly 1400 from FIG. 20A in isolation.

FIGS. 20A through 20H illustrate currently preferred embodiments of alternative backlash energizer assemblies, which, when provided, seek to remediate negative effects of torque backlash. FIG. 20A is a section similar to FIG. 14A, except depicting an alternative embodiment including backlash energizer assembly 1400. FIG. 20B is an exploded view of backlash energizer assembly 1400 from FIG. 20A in isolation. FIGS. 20C and 20D, FIGS. 20E and 20F, and FIGS. 20G and 20H are each matched pairs of cutaway section views and corresponding exploded isolation views of alternative backlash energizer embodiments 1404, 1404A and 1420.

Referring first to FIGS. 20A and 20B, backlash energizer assemblies 1400 each include set screw 1401, puck 1402, and Belleville washer 1403. Pucks 1402 are preferably of unitary hard material construction, such as metal or ceramic. Each backlash energizer assembly 1400 is shown on FIG. 20A interposed between a shaft backlash surface 1105 and a corresponding housing backlash surface 1202. Each Belleville washer 1403 is configured to contact and provide compression bias against shaft backlash surface 1105 such that torque backlash will act against Belleville washer 1403's bias during backlash events. Each Belleville washer 1403 is further positioned to react against puck 1402 as received into a corresponding recess in housing backlash surface 1202. Set screws 1401 may be inserted from the outside of lower housing 1205L through openings 1208 provided for such purpose. Set screws 1401 engage threads provided in openings 1208 to set a user-desired compression bias for Belleville washers 1403 against shaft backlash surfaces 1105.

It will thus be appreciated from FIGS. 20A and 20B that backlash energizer assemblies 1400 dampen and absorb torque backlash during backlash events. Belleville washers 1403 (and their associated compression bias) receive torque backlash, and may further temporarily store some of the torque backlash energy during backlash events. Several technical advantages are thus provided. Wear between shaft backlash surface 1105 and housing backlash surface 1202 is reduced, Concussive energy loss between shaft backlash surface 1105 and housing backlash surface 1202 is also reduced by removal of a gap between the two. Further, torque energy during backlash events is not completely lost. Referring to FIG. 20A, any torque backlash energy stored in Belleville washers 1403 during a backlash event will be released when clockwise torque is reestablished (per shaft rotation direction R shown on FIG. 20A). Further, compression bias of Belleville washers 1403 tends to keep shaft pins 1106, TTEs 1300 and housing bearing surfaces 1203 fully engaged by continuous contact during both normal torque transfer periods and torque backlash events. This in turn: (1) reduces wear on contact surfaces on shaft pins 1106, TTEs 1300 and housing bearing surfaces 1203; (2) reduces concussive energy loss during a transition back to normal torque after a torque backlash event; and (3) reduces the chance of TTEs 1300 becoming dislocated between shaft pins 1106 and housing bearing surfaces 1203 during torque backlash events.

Figure 20D:
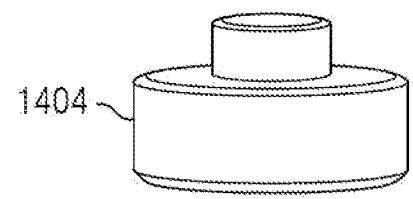
Figure 20C:
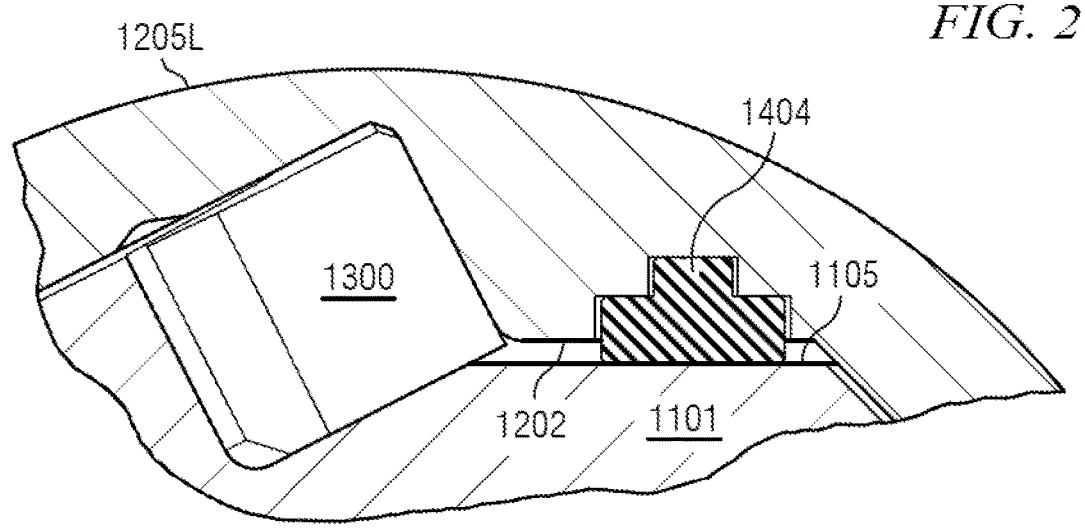

FIGS. 20C and 20D illustrate an alternative embodiment to the backlash energizer assembly 1400 of FIGS. 20A and 20B. On FIGS. 20C and 20D, torque backlash remediation is provided by a single puck 1404. Similar to puck 1402 in backlash energizer assembly 1400, puck 1404 is preferably of unitary hard material construction, such as metal or ceramic. Puck 1404 on FIGS. 20C and 20D provides advantages of simplicity of construction and assembly over backlash energizer 1400 on FIGS. 20A and 20B, at the expense of advantages that may be provided by the compression bias of Belleville washer 1403 in backlash energizer 1400, described above.

Figure 20F:
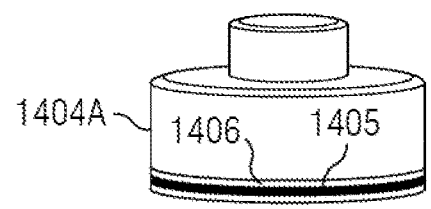
Figure 20E:
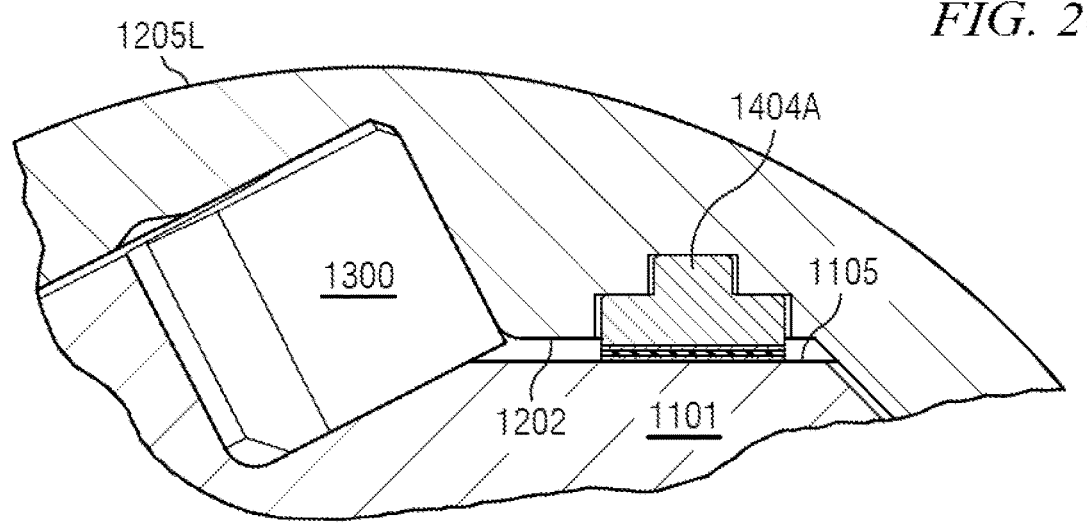

FIGS. 20E and 20F illustrate an alternative embodiment to the backlash energizer embodiment illustrated on FIGS. 20C and 20D. On FIGS. 20E and 20F, a laminated puck 1404A substituted for the plain single puck 1404 of FIGS. 20C and 20D. Laminated puck 1404A provides a resilient laminate construct for opposing contact with shaft backlash surface 1105, in which the laminate preferably includes alternating elastomer layers 1405 and metal layers 1406. The laminate, however, may be of any suitable materials. The scope of this disclosure is not limited in this regard. The scope of this disclosure is further not limited to the design of laminate, including as to number of layers and their thicknesses. Puck 1404A on FIGS. 20E and 20F provides similar advantages of simplicity of construction and assembly as puck 1404 on FIGS. 20C and 20D, and the laminar construction of puck 1404A may also provide some (or all) of the advantages that may be provided by the compression bias of Belleville washer 1403 in backlash energizer 1400, described above.

Figure 20G:
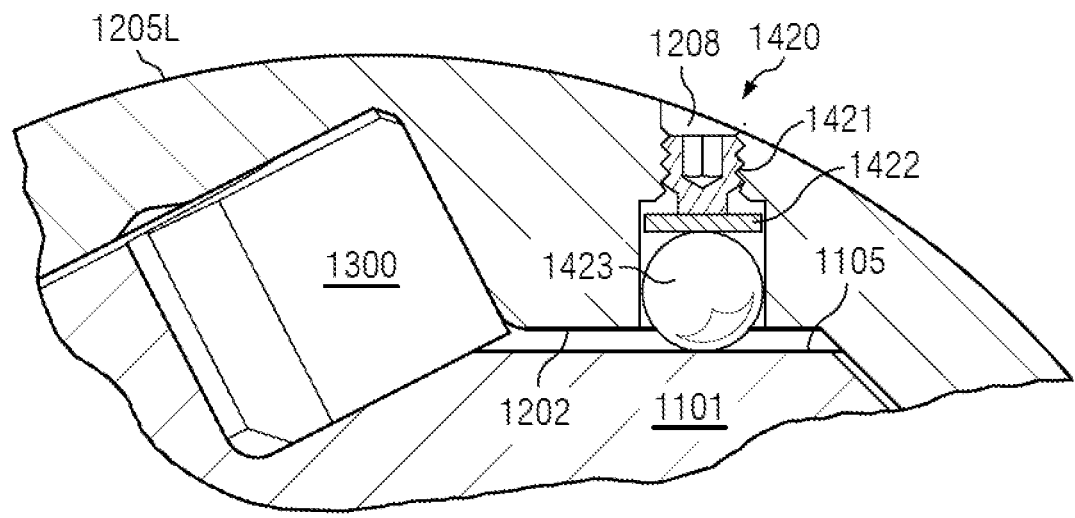
Figure 20H:
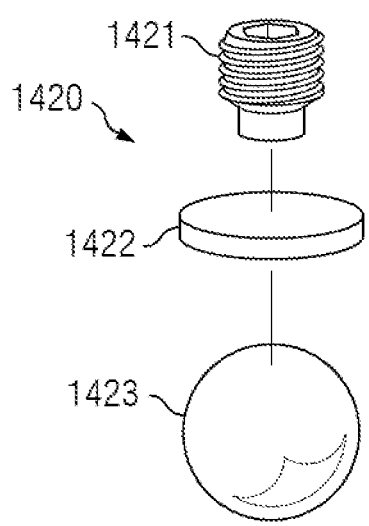

FIGS. 20G and 20H illustrate backlash energizer assembly 1420 as a yet further alternative embodiment to backlash energizers previously described with reference to FIGS. 20A and 20B, 20C and 20D, and 20E and 20F. Backlash energizer assembly 1420 includes set screw 1421, plate 1422 and ball 1423. Backlash energizer assembly 1420 on FIGS. 20G and 20H is similar in overall design to backlash energizer assembly 1400 on FIGS. 20A and 20B, except that plate 1422 in assembly 1420 substitutes for puck 1402 in assembly 1400, and ball 1423 in assembly 1420 substitutes for Belleville washer 1423 in assembly 1400. Also, comparing FIGS. 20G and 20A, the recess provided in lower housing 1205L for plate 1422 and ball 1423 on FIG. 20G may have to be adapted dimensionally to suit plate 1422 and ball 1423 as compared to the corresponding recess for puck 1402 and Belleville washer 1403 on FIG. 20A. Preferably, the recess provided on FIG. 20G leaves sufficient clearance from ball 1423 to allow ball 1423 to rotate within such recess. Backlash energizer assembly 1420 on FIGS. 20G and 20H thus further facilitates keeping shaft pins 1106, TTEs 1300 and housing bearing surfaces 1203 fully contact-engaged during both normal torque periods and torque backlash events even when (especially when) there is relative articulating movement between shaft backlash surface 1105 and housing backlash surface 1202. It will be appreciated that in previously described embodiments (FIGS. 20A and 20B, 20C and 20D, and 20E and 20F), keeping shaft pins 1106, TTEs 1300 and housing bearing surfaces 1203 fully contact-engaged during relative articulating movement between shaft backlash surface 1105 and housing backlash surface 1202 requires sliding contact between shaft backlash surface 1105 and Belleville washer 1403, and pucks 1404 and 1404A respectively. Such sliding contact may lead to wear and/or loss of contact between shaft backlash surface 1105 and Belleville washer 1403, and pucks 1404 and 1404A respectively. Rolling contact between shaft backlash surface 1105 and ball 1423 on FIGS. 20G and 20H remediates any such concerns brought on by corresponding sliding contact in other backlash energizer embodiments.

It will be understood that the scope of this disclosure is not limited to the backlash energizer designs described above. The scope of this disclosure is not limited to any specific backlash energizer embodiment or configuration thereof. Some embodiments may provide no backlash energizer at all, or a hybrid including backlash energizers in some locations and not others. Some embodiments may further provide hybrids in which different backlash energizer designs are mixed on one housing assembly, or over two housing assemblies (upper and lower). Such embodiments providing mixed configurations may also include hybrid embodiments in which no backlash energizer is provided at selected locations.

Figure 15A:
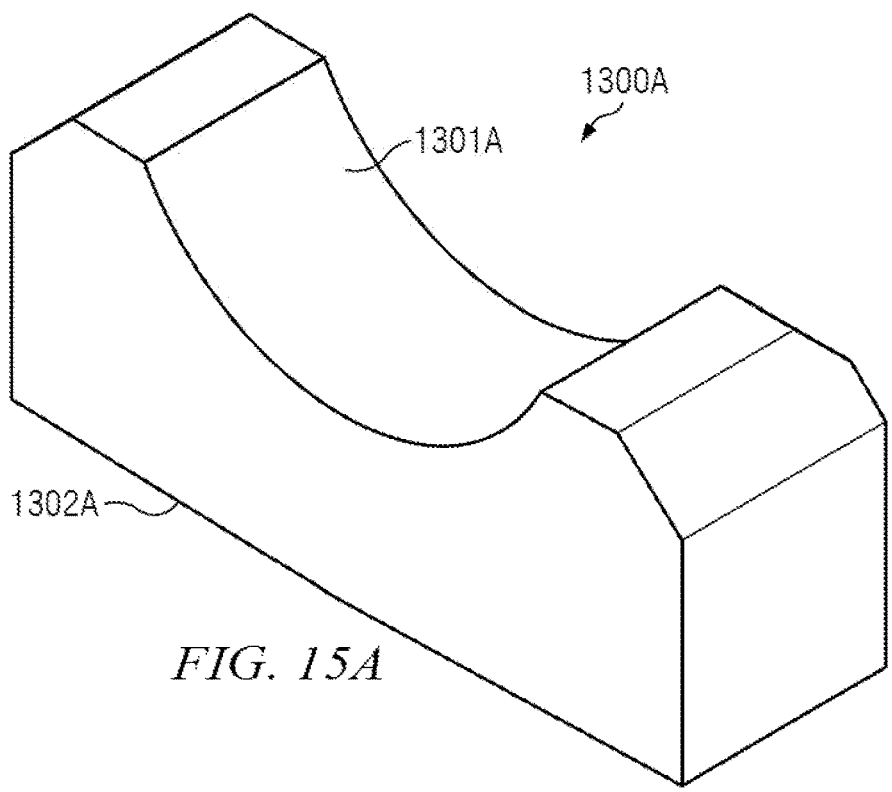
FIG. 15A illustrates Torque Transfer Element (TTE) 1300A, which for reference is the same TTE embodiment as TTE 1300 depicted on FIGS. 13A and 17.

FIGS. 15A through 15G illustrate various alternative Torque Transfer Element ("TTE") embodiments. Earlier disclosure identified TTEs 1300 included in the illustrated embodiments of upper and lower housing assemblies 1200U, 1200L on FIGS. 13A, 14A, 14B and 17. FIG. 15A illustrates TTE 1300A, which for reference is the same TTE embodiment as TTE 1300 depicted on FIGS. 13A and 17. FIGS. 15B through 15G illustrate TTEs 1300B through 1300G respectively (in which TTE 1300B through 1300G are alternative embodiments to TTE assembly 1300A on FIG. 15A). FIG. 16 is an enlargement as shown on FIG. 15B.

TTE 1300A on FIG. 15A includes curved TTE pin bearing surface 1301A and TTE housing bearing surface 1302A, which correspond to TTE pin bearing surface 1301 and TTE housing bearing surface 1302 on FIGS. 13A, 14A, 14B and 17, for example.

Figure 15B:
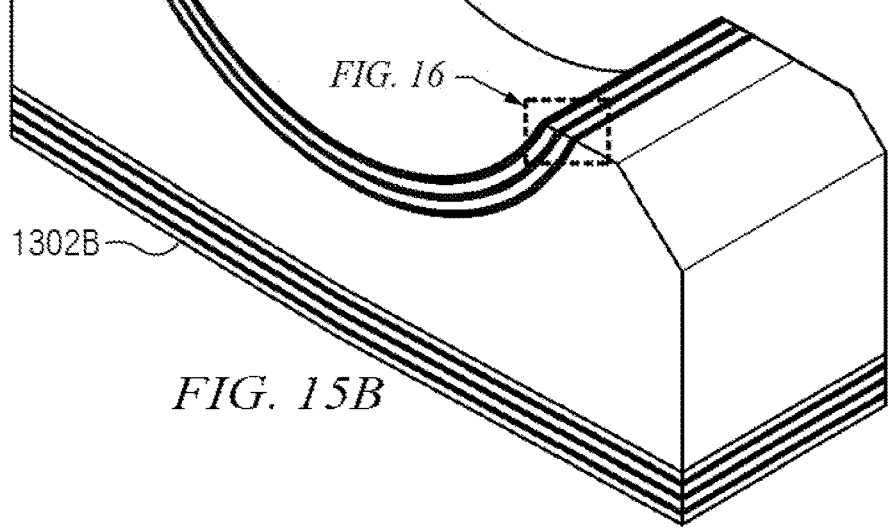
FIGS. 15B through 15G illustrate TTEs 1300B through 1300G respectively (in which TTE 1300B through 1300G are alternative embodiments to TTE assembly 1300A on FIG. 15A)

FIG. 15B and FIG. 16 are similar to FIGS. 3 and 4. FIGS. 3 and 4 are described in detail above in this disclosure. TTE 1300B on FIG. 15B includes curved TTE pin bearing surface 1301B and TTE housing bearing surface 1302B. Curved TTE pin bearing surface 1301B and TTE housing bearing surface 1302B on FIG. 15B each include a laminate for opposing contact with curved shaft pin bearing surface 1109 and housing bearing surface 1203 (refer FIG. 14B, for example). The laminate preferably includes alternating TTE elastomer and metal layers, such as TTE elastomer layers 1314 and TTE metal layers 1312 on curved TTE pin bearing surface 1301B depicted on FIG. 16. The laminate, however, may be of any suitable materials. The scope of this disclosure is not limited in this regard. The scope of this disclosure is further not limited to the design of laminate, including as to number of layers and their thicknesses. TTE 1300B on FIG. 15B, with its laminated bearing surfaces, enables resilient contact with curved shaft pin bearing surface 1109 and housing bearing surface 1203 with some compression bias. With further reference to FIG. 14B, such compression bias assists with keeping shaft pins 1106, TTEs 1300B and housing bearing surfaces 1203 fully engaged by continuous contact during both normal torque transfer periods and torque backlash events. In particular, and referring momentarily to FIG. 14A, it will be understood that compression bias from TTE 1300B may retain shaft pins 1106, TTEs 1300B and housing bearing surfaces 1203 together during misaligned rotation.

Figure 15C:
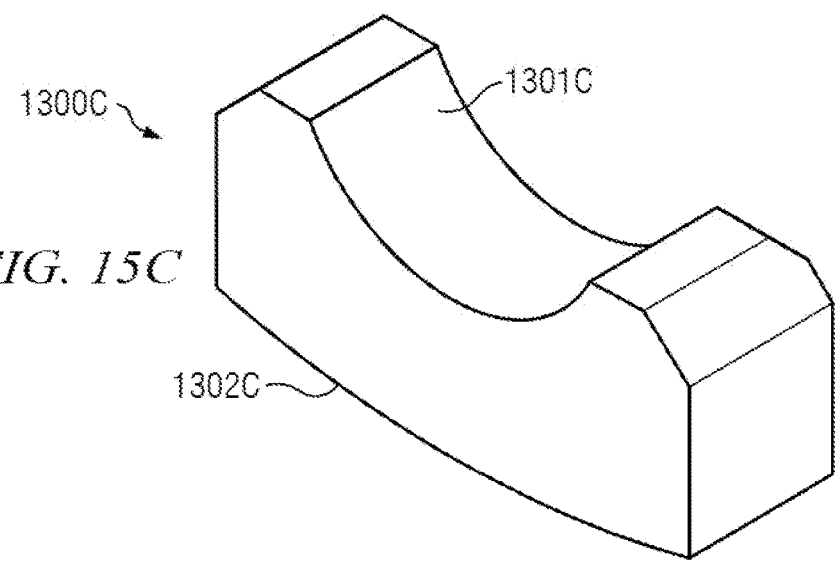
Figure 15D:
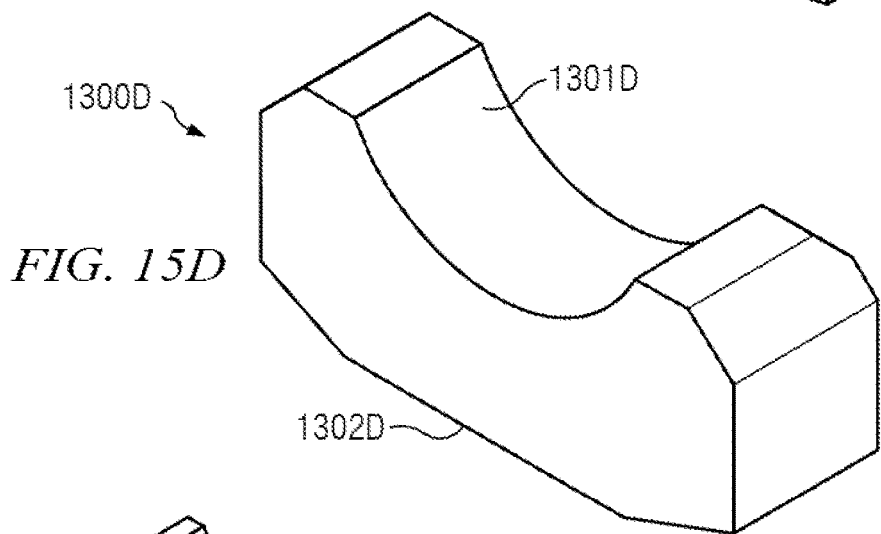
Figure 15E:
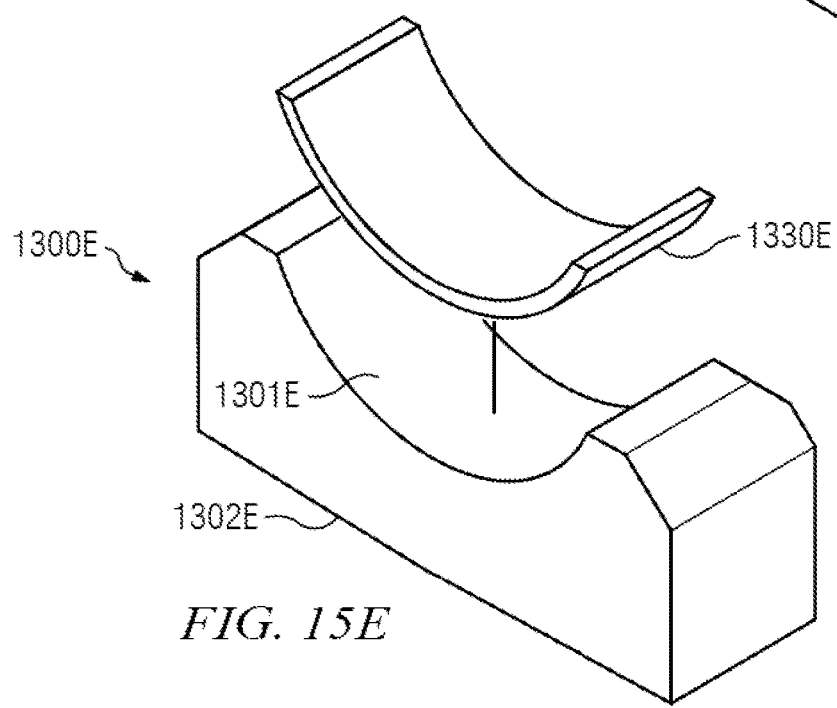
Figure 15F:
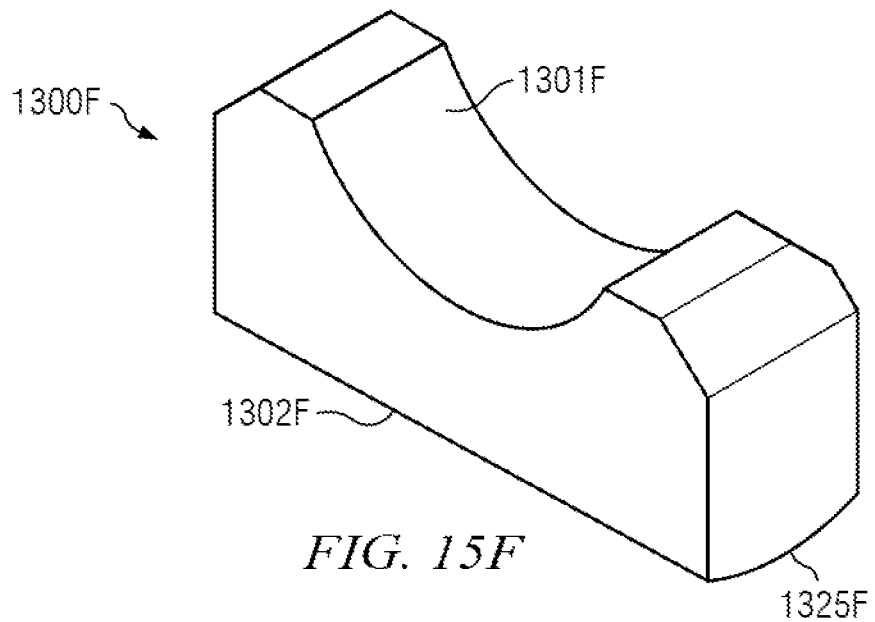
Figure 15G:
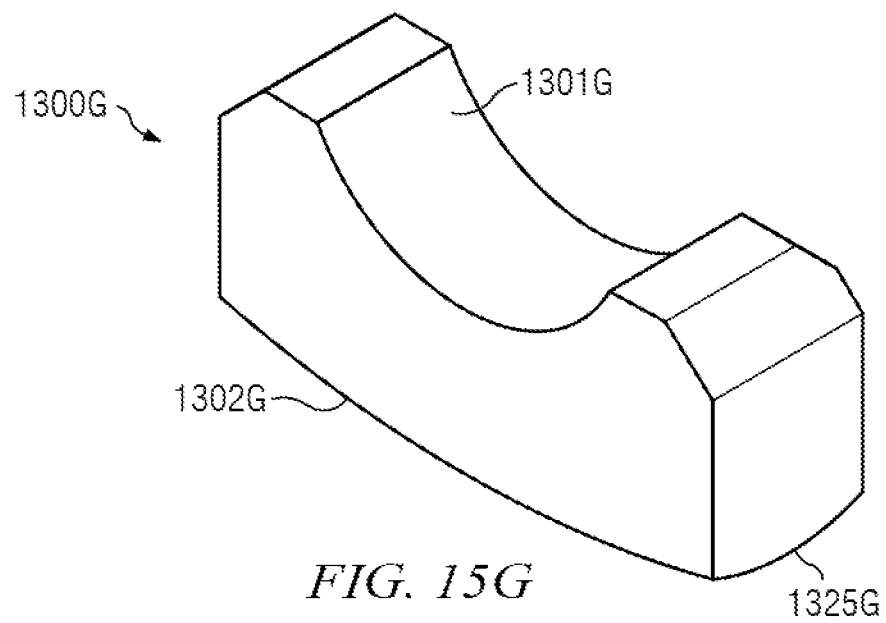

Referring now to FIGS. 15C through 15G together, TTEs 1300C through 1300G each include curved TTE pin bearing surfaces 1301C through 1301G and TTE housing bearing surfaces 1302C through 1302G respectively. TTE housing bearing surfaces 1302C, 1302F and 1302G each differ from curved TTE housing bearing surface 1302A on FIG. 15A in that they have curvature, whereas TTE housing bearing surface 1302A on FIG. 15A is substantially planar. TTE housing bearing surface 1302C on FIG. 15C is curved in a longitudinal transmission assembly direction (i.e. parallel to undeflected shaft centerline 1103 shown on FIGS. 19B and 19C). TTE housing bearing surface 1302F on FIG. 15F is curved in a transverse direction 1325F (i.e. orthogonal to undeflected shaft centerline 1103 shown on FIGS. 19B and 19C). TTE housing bearing surface 1302G on FIG. 51G is curved in both longitudinal and transverse directions (1325G). With momentary reference to FIGS. 14A and 14B, curvature on TTE housing bearing surfaces 1302C, 1302F and 1302G further assists with continuous contact between housing bearing surfaces 1203 and TTE housing bearing surfaces 1302C, 1302F and 1302G during misaligned rotation.

Referring now to FIG. 15D, TTE 1300D includes curved TTE pin bearing surface 1301D and TTE housing bearing surface 1302D. TTE 1300D on FIG. 15D is a further alternative embodiment to TTE 1300A on FIG. 15A. TTE housing bearing surface 1302D on FIG. 15D differs from TTE housing bearing surface 1302A on FIG. 15A in that TTE housing bearing surface 1302D includes angled faces at the periphery, whereas TTE housing bearing surface 1302A on FIG. 15A is substantially planar. Embodiments according to FIG. 15D are useful to provide clearance at the edges of TTE housing bearing surface 1302D in limited space deployments where the corners of TTE 1300D might interfere with corners in housing cavity receptacle 1207 (refer to FIG. 14B, for example).

Referring now to FIG. 15E, TTE 1300E includes curved TTE pin bearing surface 1301E and TTE housing bearing surface 1302E. TTE 1300E on FIG. 15E is a further alternative embodiment to TTE 1300A on FIG. 15A. Curved TTE pin bearing surface 1301E on FIG. 15E differs from curved TTE pin bearing surface 1301A on FIG. 15A in that curved TTE pin bearing surface 1301E provides hard facing 1330E. (It will be understood that hard facing 1330E is actually integral with curved TTE pin bearing surface 1301E although illustrated as a separate item for clarity). It will be further appreciated that internal hard facing 1300E on curved TTE pin bearing surface 1301E, per FIG. 15E, reduces contact wear on curved TTE pin bearing surface 1301E during misaligned shaft rotation.

It will be understood that the scope of this disclosure is not limited to the various TTE designs described above. The scope of this disclosure is not limited to any specific TTE embodiment or configuration thereof. Some embodiments may provide hybrids in which different TTE designs are mixed on one housing assembly, or over two housing assemblies (upper and lower). Further, TTE designs as described above may be combined into single TTE embodiments (such as, for example, combining the hard facing embodiment of FIG. 15E with a curved TTE housing bearing surface embodiment selected from FIGS. 15C, 15F or 15G into one hybrid TTE embodiment).

Although the inventive material in this disclosure has been described in detail along with some of its technical advantages, it will be understood that various changes, substitutions and alternations may be made to the detailed embodiments without departing from the broader spirit and scope of such inventive material as set forth in the following claims.

We claim:

1. A torque transmission, comprising:
   an input shaft adapter having first and second ends, the first end of the input shaft adapter configured to mate with an input shaft, the second end of the input shaft adapter providing a plurality of pins disposed on an outer surface of the input shaft adapter, each pin providing a curved pin portion;
   an output shaft adapter having first and second ends, the second end of the output shaft adapter configured to mate with an output shaft, the first end of the output shaft adapter providing a recess formed therein;
   a plurality of notches formed in a recess periphery of the recess, one notch for each pin disposed on the input shaft adapter, wherein the recess is shaped and sized to receive the second end of the input shaft adapter such that when the second end of the input shaft adapter is received inside the recess, each pin on the input shaft adapter is received into a corresponding notch on the recess;
   a plurality of bearings, a curved portion provided on each bearing; and
   wherein one bearing is interposed between one pin and one corresponding notch when the pins are received into their corresponding notches, such that the curved portion of the bearing contacts the curved pin portion; and
   wherein selected bearings each further comprise a flat portion, each flat portion contacting the notch when the pins are received into their corresponding notches.

2. The torque transmission of claim 1, in which selected ones of the curved portions of the bearings and the flat portions of the bearings include a laminate.

3. The torque transmission of claim 2, in which the laminate comprises metal and elastomer layers.

4. The torque transmission of claim 1, further comprising:
   a boot retainer, the boot retainer having first and second boot retainer ends; and
   an outer input shaft adapter periphery on the second end of the input shaft adapter and an outer output shaft adapter periphery on the first end of the output shaft adapter;
   wherein, when the second end of the input shaft adapter is received inside the recess, the boot retainer is received over the input shaft adapter and the output shaft adapter such that the first end of the boot retainer is affixed to the outer input shaft adapter periphery and the second end of the boot retainer is affixed to the outer output shaft adapter periphery.

5. The torque transmission of claim 1, further comprising:
   an outer output shaft adapter periphery on the first end of the output shaft adapter;
   a fill port connecting the outer output shaft adapter periphery to the recess; and
   an evacuate port connecting the outer output shaft adapter periphery to the recess.

6. The torque transmission of claim 1, in which selected pins each have a midpoint, and in which the curved pin portions on said selected pins each have a radius whose centerpoint coincides with the midpoint.

7. The torque transmission of claim 1, in which each pin has a maximum pin nose diameter, and in which selected pin nose diameters are on a locus that coincides with an outer diameter of the output shaft.

8. An articulated transmission disposed to transmit torque via misaligned rotation, the transmission comprising:
   a shaft having an axial shaft centerline about which the shaft is disposed to rotate;
   a plurality of shaft pins, each shaft pin extending radially from the shaft centerline, each shaft pin further providing a convex shaft pin bearing surface thereon;
   a generally cylindrical housing having an axial housing centerline about which the housing is disposed to rotate, the housing having a plurality of housing cavity receptacles formed therein, each housing cavity receptacle for receiving a corresponding shaft pin; and a plurality of torque transfer elements (TTEs), each TTE providing a concave TTE pin bearing surface and a TTE housing bearing surface;

wherein each housing cavity receptacle provides a housing bearing surface;

wherein a shaft pin and a TTE are received into each housing cavity receptacle such that within each housing cavity receptacle, the convex shaft pin bearing surface is received onto the concave TTE pin bearing surface and the TTE housing bearing surface opposes the housing bearing surface;

wherein, responsive to misaligned rotation of the shaft centerline with respect to the housing centerline and regardless of angular deflection of the shaft centerline with respect to the housing centerline experienced within each housing receptacle during an articulated revolution of the shaft: (1) the concave TTE pin bearing surfaces are free to slidably displace relative to the convex shaft pin bearing surfaces; and (2) the TTE housing bearing surfaces are free to slidably displace against corresponding housing bearing surfaces.

9. The transmission of claim 8, in which the TTEs float at least generally parallel to an untilted shaft centerline when the TTE housing bearing surfaces slidably displace against corresponding housing bearing surfaces.

10. The transmission of claim 8, in which:

each shaft pin further provides a shaft backlash surface; and each housing cavity receptacle further provides a housing backlash surface to oppose a corresponding shaft backlash surface;

wherein the transmission further includes a backlash energizer assembly interposed between at least one opposing shaft backlash surface and housing backlash surface.

11. The transmission of claim 10, in which the backlash energizer assembly includes a puck.

12. The transmission of claim 11, in which the puck includes a laminate of metal and elastomer layers.

13. The transmission of claim 11, in which the puck separates a set screw and a Belleville washer.

14. The transmission of claim 10, in which the backlash energizer assembly includes a plate, and in which the plate separates a set screw and a ball.

15. The transmission of claim 8, in which selected ones of the TTE pin bearing surfaces and the TTE housing bearing surfaces include a laminate.

16. The transmission of claim 15, in which the laminate comprises metal and elastomer layers.

17. The transmission of claim 8, in which selected TTE pin bearing surfaces have undergone a hardening treatment.

18. The transmission of claim 8, in which selected TTE housing bearing surfaces include curvature.

19. The transmission of claim 8, in which selected TTE housing bearing surfaces include angled faces.

20. An articulated transmission disposed to transmit torque via misaligned rotation, the transmission comprising:

a shaft having an axial shaft centerline about which the shaft is disposed to rotate;

a plurality of shaft pins, each shaft pin extending radially from the shaft centerline, each shaft pin further providing a convex shaft pin bearing surface thereon;

a generally cylindrical housing having an axial housing centerline about which the housing is disposed to rotate, the housing having a plurality of housing cavity receptacles formed therein, each housing cavity receptacle for receiving a corresponding shaft pin; and a plurality of torque transfer elements (TTEs), each TTE providing a concave TTE pin bearing surface and a TTE housing bearing surface;

wherein each housing cavity receptacle provides a housing bearing surface;

wherein a shaft pin and a TTE are received into each housing cavity receptacle such that within each housing cavity receptacle, the convex shaft pin bearing surface is received onto the concave TTE pin bearing surface and the TTE housing bearing surface opposes the housing bearing surface;

wherein, responsive to misaligned rotation of the shaft centerline with respect to the housing centerline and regardless of angular deflection of the shaft centerline with respect to the housing centerline experienced within each housing receptacle during an articulated revolution of the shaft: (1) the concave TTE pin bearing surfaces are free to slidably displace relative to the convex shaft pin bearing surfaces; and (2) the TTE housing bearing surfaces are free to slidably displace against corresponding housing bearing surfaces;

wherein the TTEs float at least generally parallel to an unfitted shaft centerline when the TTE housing bearing surfaces slidably displace against corresponding housing bearing surfaces;

wherein selected ones of the TTE pin bearing surfaces and the TTE housing bearing surfaces include a laminate.

* * * * *

UNITED STATES PATENT AND TRADEMARK OFFICE
CERTIFICATE OF CORRECTION

PATENT NO. : 11,815,139 B2
APPLICATION NO. : 17/190386
DATED : November 14, 2023
INVENTOR(S) : Jing Lu et al.

It is certified that error appears in the above-identified patent and that said Letters Patent is hereby corrected as shown below:

On the Title Page

In item (57), the Abstract, Line 8, replace "T" with --TTEs--.

In the Specification

In Column 8, Line 27, replace "shall" with --shaft--.

In Column 14, Line 10, replace "Megiun" with --Megum--.

In Column 21, Line 10, replace "minor" with --mirror--.

In Column 21, Line 44, replace "shall" with --shaft--.

In Column 24, Line 3, replace "11B" with --TTE--.

In Column 25, Line 24, replace "unfilled" with --untilted--.

In the Claims

In Claim 20, Column 32, Line 43, replace "unfitted" with --untilted--.

Signed and Sealed this
Sixteenth Day of April, 2024

*Katherine Kelly Vidal*
Katherine Kelly Vidal
*Director of the United States Patent and Trademark Office*